(12) United States Patent
Ito et al.

(10) Patent No.: US 12,313,880 B2
(45) Date of Patent: May 27, 2025

(54) OPTICAL INTEGRATED DEVICE, OPTICAL INTEGRATED CIRCUIT WAFER, AND METHOD OF MANUFACTURING THE OPTICAL INTEGRATED DEVICE

(71) Applicant: FUJITSU OPTICAL COMPONENTS LIMITED, Kawasaki (JP)

(72) Inventors: Tatsuya Ito, Yokohama (JP); Takeshi Matsumoto, Ebina (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 248 days.

(21) Appl. No.: 17/884,895

(22) Filed: Aug. 10, 2022

(65) Prior Publication Data

US 2023/0084190 A1 Mar. 16, 2023

(30) Foreign Application Priority Data

Sep. 13, 2021 (JP) .................................. 2021-148643

(51) Int. Cl.
 *G02B 6/122* (2006.01)
 *G02B 6/12* (2006.01)
 *G02B 6/136* (2006.01)
 *G02B 6/30* (2006.01)

(52) U.S. Cl.
 CPC ........... *G02B 6/1228* (2013.01); *G02B 6/136* (2013.01); *G02B 6/305* (2013.01); *G02B 2006/12061* (2013.01); *G02B 2006/12147* (2013.01)

(58) Field of Classification Search
 None
 See application file for complete search history.

(56) References Cited

U.S. PATENT DOCUMENTS

| | | | | |
|---|---|---|---|---|
| 9,746,607 B2 * | 8/2017 | Collins | ................ | G02B 6/1228 |
| 9,823,420 B2 | 11/2017 | Kato et al. | | |
| 9,835,801 B1 * | 12/2017 | Qian | ...................... | G02B 6/262 |
| 9,946,029 B2 | 4/2018 | Shi et al. | | |
| 10,120,133 B2 * | 11/2018 | Golper | ...................... | G02B 6/30 |
| 10,330,864 B2 * | 6/2019 | Asghari | ................... | G02B 6/14 |
| 10,345,524 B2 | 7/2019 | Jiang et al. | | |
| 10,393,967 B2 * | 8/2019 | Piazza | ................. | G02B 6/12002 |
| 11,536,903 B1 * | 12/2022 | Letavic | ................... | G02B 6/124 |
| 11,808,996 B1 * | 11/2023 | Bian | ...................... | G02B 6/4206 |
| 2017/0160481 A1 * | 6/2017 | Ling | ...................... | G02B 6/305 |
| 2017/0371101 A1 * | 12/2017 | Ishikura | ................. | G02B 6/125 |
| 2021/0271024 A1 * | 9/2021 | Chen | .................... | G02B 6/1228 |
| 2023/0084190 A1 * | 3/2023 | Ito | ........................ | G02B 6/1223 |
| | | | | 385/14 |

* cited by examiner

*Primary Examiner* — Rhonda S Peace
(74) *Attorney, Agent, or Firm* — STAAS & HALSEY LLP

(57) ABSTRACT

An optical integrated device includes a substrate and a waveguide that has a hollow structure. The waveguide includes a first waveguide and a second waveguide that is optically coupled to the first waveguide and that has a smaller relative refractive index difference than that of the first waveguide and converts a mode diameter to a mode diameter of an optical fiber in accordance with travelling of light. The optical integrated device includes a dent portion that is formed in the vicinity of the dicing line on the substrate such that the width of the output end surface is smaller than the core width of the optical fiber that is optically coupled to the output end surface in the state in which the dicing end surface of the substrate protrudes farther than the output end surface of the second waveguide in the axial direction of the optical waveguide.

10 Claims, 20 Drawing Sheets

OPTICAL INTEGRATED DEVICE, OPTICAL INTEGRATED CIRCUIT WAFER, AND METHOD OF MANUFACTURING THE OPTICAL INTEGRATED DEVICE

CROSS-REFERENCE TO RELATED APPLICATION

This application is based upon and claims the benefit of priority of the prior Japanese Patent Application No. 2021-148643, filed on Sep. 13, 2021, the entire contents of which are incorporated herein by reference.

FIELD

The embodiments discussed herein are related to an optical integrated device, an optical integrated circuit wafer, and a method of manufacturing the optical integrated device.

BACKGROUND

For example, there is a known optical device, such as an optical coupler, that extracts light of an optical integrated device (photonics integrated circuit: PIC) used for high-speed optical communication. There is a demand for optical devices that implement small sized, low powered, and a large capacity devices in response to marketing needs, and in order to implement the demand, Si-Photonics (SiPh) devices in each of which waveguides and electrode substrates are integrated on a Si substrate is drawing attention. A great advantage of the SiPh devices is that, by taking advantage of a high definition processing technology that is used to manufacture a CMOS, it is possible to easily manufacture a large-scale optical integrated circuit constituted of a lot of element devices. Downsizing of the optical devices is remarkable, and the SiPh devices in each of which waveguides and electrode substrates are integrated on the Si substrate is drawing attention. In order to implement the SiPh-PICs as modules for optical communication, there is a need to route a Si waveguide included in the optical integrated device up to a chip end surface, connect the Si waveguide to an optical fiber, and input and output light. In the optical fiber coupling structure in which the Si waveguide is optically coupled to the optical fiber, a low coupling loss and high reliability are requested; however, it is difficult to satisfy both requests.

In a SiPh-PIC, a Si thin line included in silicon dioxide is used as the optical waveguide; however, a mode diameter of a waveguide is small due to a large relative refractive index difference between Si and $SiO_2$. As a result, if the SiPh-PIC is directly connected to the optical fiber, a large optical loss occurs due to a mismatch with the mode diameter. Accordingly, optical coupling is performed by using a mode diameter conversion structure, and, as the optical coupling, a lens coupling technique for linking an optical coupler to the optical fiber via, for example, a lens, and a butt joint (BJ) technique for joining, in a direct butt joint manner, for example, an optical coupler and the optical fiber are known.

When the lens coupling technique is used, even if the mode diameter of the optical coupler itself of the PIC is small, it is possible to increase the mode diameter up to a normal diameter of a single mode fiber (SMF) by using a lens. However, in general, the output light mode of the optical coupler has a polarized light dependence property, and, if a spatial coupling system using a lens is used, a polarized wave dependence property of the coupling efficiency is increased. Furthermore, a device area is increased in order to construct an optical system in which a lens is sandwiched between the chip and the optical fiber, so that implementation with respect to a small sized module is difficult. Furthermore, there is also a problem in terms of cost, such as number of steps needed to manufacture the device being increased in order to adjust the optical axis, a special adjustment device being needed, and the like.

In contrast, in the BJ technique, it is possible to solve these problems about the lens coupling technique; however, it is difficult to increase, without using the lens, the output light mode diameter of the PIC to a similar level of the mode diameter of the SMF having the normal diameter.

Therefore, as a structure that is often used in the BJ connection technique, there is an inverse tapered spot size converter (SSC) structure. FIG. 17 is a schematic plan view of the inverse tapered SSC structure. In the inverse tapered SSC structure, the mode diameter of the waveguide is increased by gradually reducing the width of a Si waveguide 102 (102A, 102B) that is formed on a Si substrate 101, so that the mode diameter of the waveguide is made to approach the mode diameter of the SMF that has the normal diameter. However, in the inverse tapered SSC structure, it is difficult to increase the mode diameter of the waveguide to nearly the mode diameter of the SMF that has the normal diameter (the mode diameter of about 10 μm). Furthermore, as an advantage, the structure is constituted by using only the Si waveguide 102, so that fabrication is easy. However, an efficient optical connection is limited to only a small diameter core fiber that has a small mode diameter (4 μm), so that, in order to install the devices to the module, in general, the small diameter core fiber needs to be additionally subjected fusion welding to the core fiber. As a result, in the inverse tapered SSC structure, an excessive loss occurs in a fusion welding portion between the small diameter core fiber and a normal core fiber.

Accordingly, as an optical coupler that enables to increase the output light mode diameter for outputting light from the PIC, for example, there is an optical coupler having a hollow structure. FIG. 18 is a perspective view illustrating an example of an optical coupler 100 having a hollow structure. The optical coupler 100 having the hollow structure illustrated in FIG. 18 includes the Si substrate 101, a clad layer 103 made of $SiO_2$, and an optical waveguide 104 that extends from the clad layer 103, that is located above the Si substrate 101, and that is surrounded by an air layer 107. The optical waveguide 104 includes a Si waveguide 105 and a $SiO_2$ waveguide 106. The optical coupler 100 has a structure that increases the mode diameter by converting the mode diameter from the Si waveguide 105 to the $SiO_2$ waveguide 106 and that directly connects the $SiO_2$ waveguide 106 to the SMF that has the normal diameter. The optical coupler 100 is configured to have a hollow structure by allowing the portion between the Si substrate 101 and the optical waveguide 104 to be the air layer 107. As a result, light is confined up to the leading end portion of the $SiO_2$ waveguide 106 by using the relative refractive index difference between the $SiO_2$ waveguide 106 and the air layer 107. The relative refractive index difference between the $SiO_2$ waveguide 106 and the air layer 107 is small, so that it is possible to implement the same mode diameter as that of the optical fiber that has the normal diameter.

An optical integrated circuit wafer 110 having mounted thereon a pair of the optical couplers 100 having such a hollow structure will be described. FIG. 19 is a schematic plan view illustrating an example of the optical integrated circuit wafer 110, and FIG. 20 is a cross-sectional view taken along line G-G of the optical integrated circuit wafer 110 illustrated in FIG. 19. The optical integrated circuit wafer 110 includes the pair of the optical couplers 100 on the Si substrate 101. The optical integrated circuit wafer 110 is manufactured in the state in which the leading end portion of the SiO$_2$ waveguide 106 included in one of the optical waveguides 104 included in one of the associated optical couplers 100 is linked to the leading end portion of the SiO$_2$ waveguide 106 included in the other of the optical waveguides 104 included in the other of the associated optical couplers 100. Then, regarding the optical integrated circuit wafer 110, it is possible to cut out the pair of the optical couplers 100 from the optical integrated circuit wafer 110 by dicing a dicing line DL located between the leading end portions of the SiO$_2$ waveguides 106 included in the optical couplers 100.

However, in the optical integrated circuit wafer 110, the optical coupler 100 has a hollow structure, when dicing a portion between the leading end portion of one of the SiO$_2$ waveguides 106 and the leading end portion of the other of the SiO$_2$ waveguides 106, the leading end portions of the SiO$_2$ waveguides 106 are highly likely to be damaged. Thus, there is a demand for an optical integrated circuit wafer that is able to avoid a damage of the SiO$_2$ waveguide 106 at the time of the dicing step.

FIG. 21 is a schematic plan view illustrating an example of an optical integrated circuit wafer 110A, and FIG. 22 is a cross-sectional view taken along line H-H of the optical integrated circuit wafer 110A illustrated in FIG. 21. In addition, by assigning the same reference numerals to components having the same configuration as those in the optical integrated circuit wafer 110 illustrated in FIG. 19 and FIG. 20, overlapping descriptions of the configuration and the operation thereof will be omitted. The optical integrated circuit wafer 110A illustrated in FIG. 21 includes a dent portion 109 that separates a portion between the leading end portion of the SiO$_2$ waveguide 106 that is included in one of the optical waveguides 104 and the leading end portion of the SiO$_2$ waveguide 106 that is included in the other one of the optical waveguides 104. The dent portion 109 is formed on the Si substrate 101 in the state in which the portion between the leading end portion of the one SiO$_2$ waveguide 106 is separated from the leading end portion of the other SiO$_2$ waveguide 106.

Therefore, at the time of dicing the dicing line DL located between the one optical coupler 100 and the other optical coupler 100 in the dent portion 109 from the optical integrated circuit wafer 110A, it is possible to cut out the optical couplers 100 without damaging both of the leading end portions of the optical couplers 100.

FIG. 23 is a schematic plan view illustrating an example of an optical fiber coupling structure 120A, and FIG. 24 is a cross-sectional view taken along line J-J of the optical fiber coupling structure 120A illustrated in FIG. 23. The optical fiber coupling structure 120A has a structure in which an optical fiber 121 is optically coupled to the optical coupler 100 that has been cut out from the optical integrated circuit wafer 110A illustrated in FIG. 22.

As a structure for a stable connection with the optical coupler 100, the optical fiber 121 has sometimes a structure in which, for example, a capillary 123 that is a minute block made of glass is attached around a core 122. By using the capillary 123 attached around the core 122, a connection area with a dicing end surface 101A of the optical coupler 100 is increased and a BJ connection is stabilized.

However, in the optical coupler 100, a portion in which the optical fiber 121 with the capillary 123 is brought into contact with the dicing end surface 101A is small, and has an asymmetric structure. The portion in which the capillary 123 is brought into contact with the dicing end surface 101A is able to sufficiently be closer with each other; however, a portion in which the optical coupler 100 is optically coupled to the optical fiber 121 is away from the dicing end surface 101A, and thus, an adhesive is filled in the portion.

Patent Document 1: U.S. Pat. No. 9,946,029
Patent Document 2: U.S. Pat. No. 9,823,420
Patent Document 3: U.S. patent Ser. No. 10/345,524

FIG. 25 is a diagram illustrating an example of a problem of the optical fiber coupling structure 120A. However, in the optical fiber coupling structure 120A, an adhesive 124 that is filled in a portion between the optical coupler 100 and the optical fiber 121 expands, contracts, and swells in accordance with a change in temperature, so that the optical fiber 121 may possibly rotate due to expansion and contraction of the adhesive 124 at a contact point of the corner of the dicing end surface 101A. As the result, the optical axis located between the optical fiber 121 and the optical coupler 100 is shifted caused by the rotation of the optical fiber 121, and thus, an optical coupling loss is increased. Accordingly, a yield ratio is degraded as a result of the loss that occurs caused by a curing step or the like due to UV hardening or high temperature at the time of manufacturing, or it is not possible to ensure sufficient reliability due to the occurrence of the loss depending on temperature in a use environment after fabrication.

SUMMARY

According to an aspect of an embodiment, an optical integrated device includes a substrate; and an optical waveguide that is disposed on the substrate and that has a hollow structure. The optical waveguide includes a first optical waveguide and a second optical waveguide. The second optical waveguide is optically coupled to the first optical waveguide and has a relative refractive index difference that is smaller than a relative refractive index difference of the first optical waveguide. The optical waveguide converts a mode diameter to a mode diameter of an optical fiber in accordance with travelling of light from the first optical waveguide to the second optical waveguide. The optical integrated device includes a dent portion that is formed in a vicinity of a dicing line on the substrate such that a width of an output end surface of the second optical waveguide is smaller than a core width of the optical fiber that is optically coupled to the output end surface. The dent portion is formed in a state in which a dicing end surface of the substrate protrudes farther than the output end surface of the second optical waveguide in an axial direction of the optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments. In addition, the embodiments described below may also be used in any appropriate combination as long as the embodiments do not conflict with each other.

[a] First Embodiment

Figure 1:
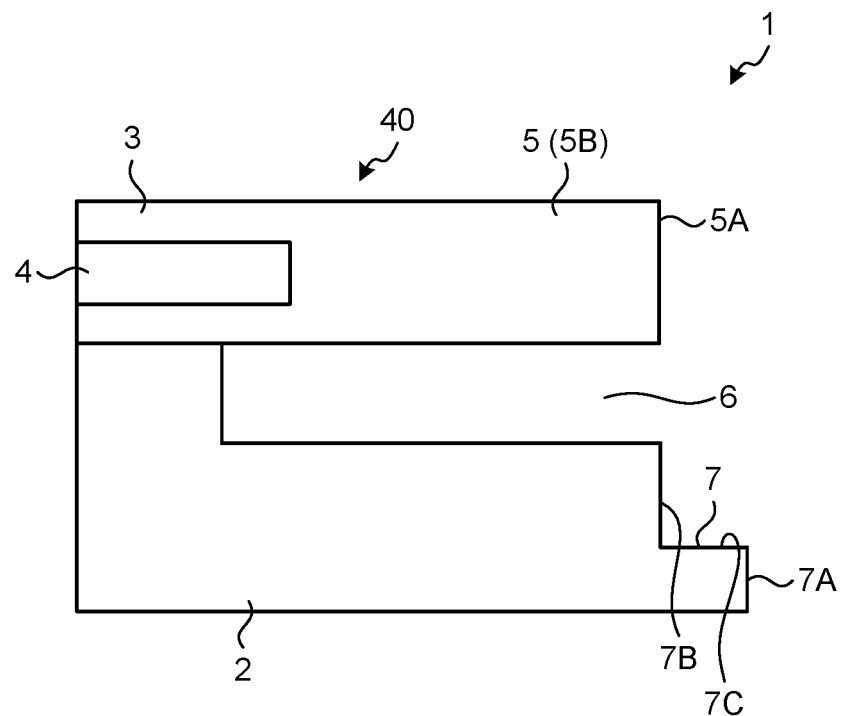
FIG. 1 is a schematic cross-sectional view illustrating an example of an optical coupler according to a first embodiment.

FIG. 1 is a schematic cross-sectional view illustrating an example of an optical coupler 1 according to a first embodiment. The optical coupler 1 illustrated in FIG. 1 is an optical integrated device with a hollow form. The optical coupler 1 includes a Si substrate 2, an optical waveguide 40 that is disposed above the Si substrate 2 and that has a hollow structure in which a portion around the optical waveguide 40 is a hollow cavity, and a clad layer 3. The Si substrate 2 has a dicing end surface 7A that is formed at the time of cutting out the pair of the optical couplers 1 from an optical integrated circuit wafer 10 that will be described later. The hollow cavity is an air layer 6. The clad layer 3 is, for example, a layer made of $SiO_2$.

The optical waveguide 40 includes a first optical waveguide 4 and a second optical waveguide 5 that has a smaller relative refractive index difference than that of the first optical waveguide 4 and that is optically coupled to the first optical waveguide 4. The first optical waveguide 4 is an optical waveguide that is made of, for example, Si and that is a semiconductor or a dielectric material having a large relative refractive index difference. The first optical waveguide 4 has a SSC structure formed in an inverse tapered manner. The second optical waveguide 5 is an optical waveguide made of, for example, $SiO_2$. The second optical waveguide 5 includes a tapered portion 5B in which the width thereof is increased toward an output end surface 5A that is a leading end portion. Furthermore, an optical fiber 21 that is optically coupled to the second optical waveguide 5 included in the optical coupler 1 is, for example, a single mode fiber (SMF). The optical coupler 1 has a function for converting a mode diameter to a mode diameter of the SMF in accordance with travelling of light from the first optical waveguide 4 to the second optical waveguide 5.

The optical coupler 1 includes a dent portion 7 that is formed in the vicinity of the dicing line DL located on the Si substrate 2. By forming the dent portion 7, the width of the dent portion 7 including the output end surface 5A is smaller than the width of a glass block of the optical fiber 21 that is optically coupled to the output end surface 5A in the state in which the dicing end surface 7A protrudes farther than the output end surface 5A in an axial direction of the optical waveguide 40. The dent portion 7 has a limited width having a dent structure in which the output end surface 5A is made different from the dicing end surface 7A. By forming the dent portion 7, the Si substrate 2 includes a wall surface 7B that is flush with the output end surface 5A and a bottom surface 7C that perpendicularly extends from the wall surface 7B.

Figure 2:
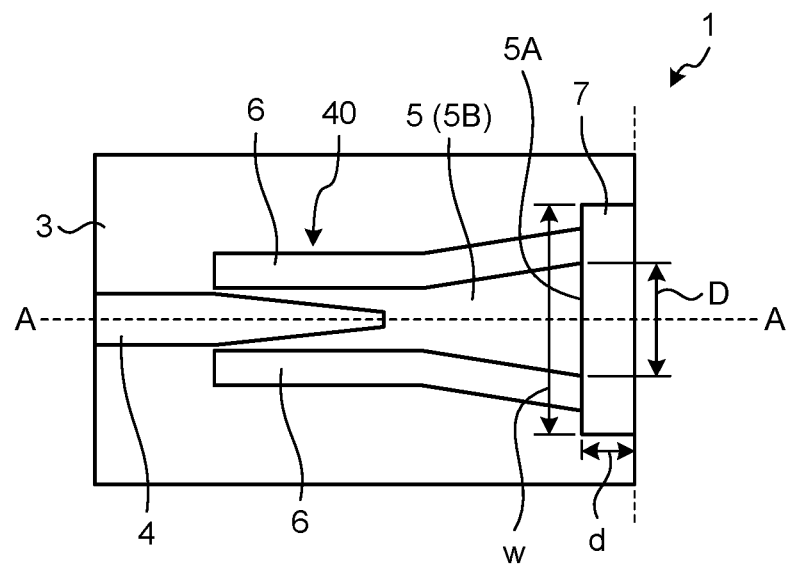
FIG. 2 is a schematic plan view of the optical coupler.

FIG. 2 is a schematic plan view of the optical coupler 1. It is desirable that a width w of the dent portion 7 be smaller than that of a capillary 22 included in the optical fiber 21 that is subjected to optical coupling. In addition, the capillary 22 included in the optical fiber 21 has a shape of square of side about 1000 μm. The width w of the dent portion 7 needs to be increased up to the point enough not to block the light that is emitted from the output end surface 5A of the second optical waveguide 5 included in the optical coupler 1 and that radially spreads. Accordingly, the width w of the dent portion 7 can be represented by $w \geq 2d*(\lambda/\pi D)$. In addition, $\lambda$ denotes the wavelength of the light passing through the optical coupler 1, d denotes the depth of the dent portion 7, and D denotes the mode diameter. The width w of the dent portion 7 is less than the diameter of the leading end of the SMF (the width of the glass block of the SMF) that is optically coupled to the output end surface 5A of the second optical waveguide 5 included in the optical coupler 1.

Figure 3:
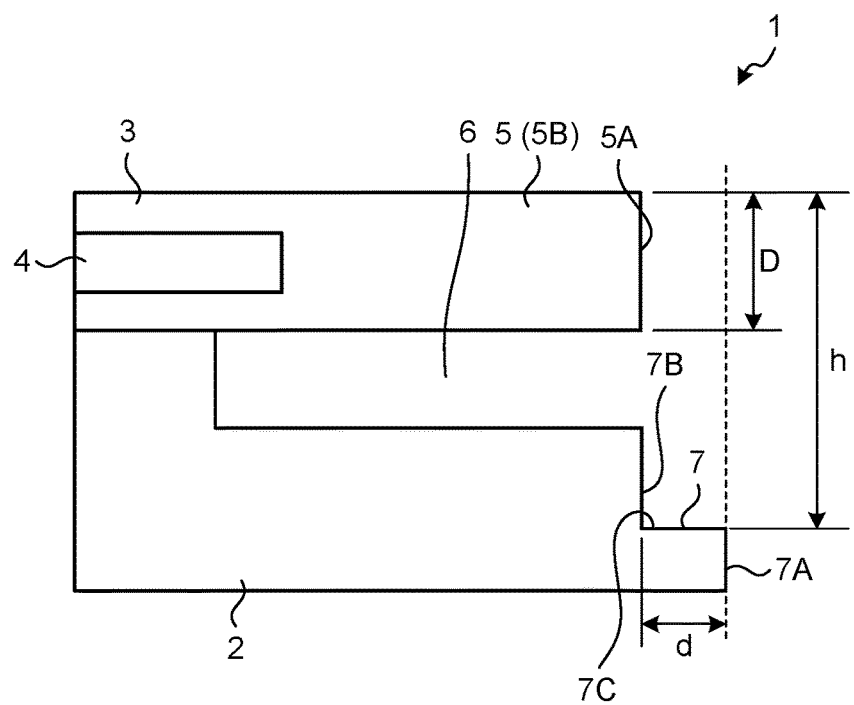
FIG. 3 is a cross-sectional view taken along line A-A of the optical coupler illustrated in FIG. 2.

FIG. 3 is a cross-sectional view taken along line A-A of the optical coupler 1 illustrated in FIG. 2. In addition, the height of the dent portion 7 needs to be increased to a degree that does not block the light that is emitted from the output end surface 5A of the second optical waveguide 5 included in the optical coupler 1 and that radially spreads. Accordingly, the height h of the dent portion 7 can be represented by $h \geq d*(\lambda/\pi D)$. The height h of the dent portion 7 is a distance between the bottom surface 7C of the dent portion 7 formed on the Si substrate 2 and the top surface of the second optical waveguide 5 in the vertical direction. In addition, the depth d of the dent portion 7 is, for example, 30 μm; the width w of the dent portion 7 is, for example, 200 μm; and the height h of the dent portion 7 is, for example, 100 μm.

Figure 4:
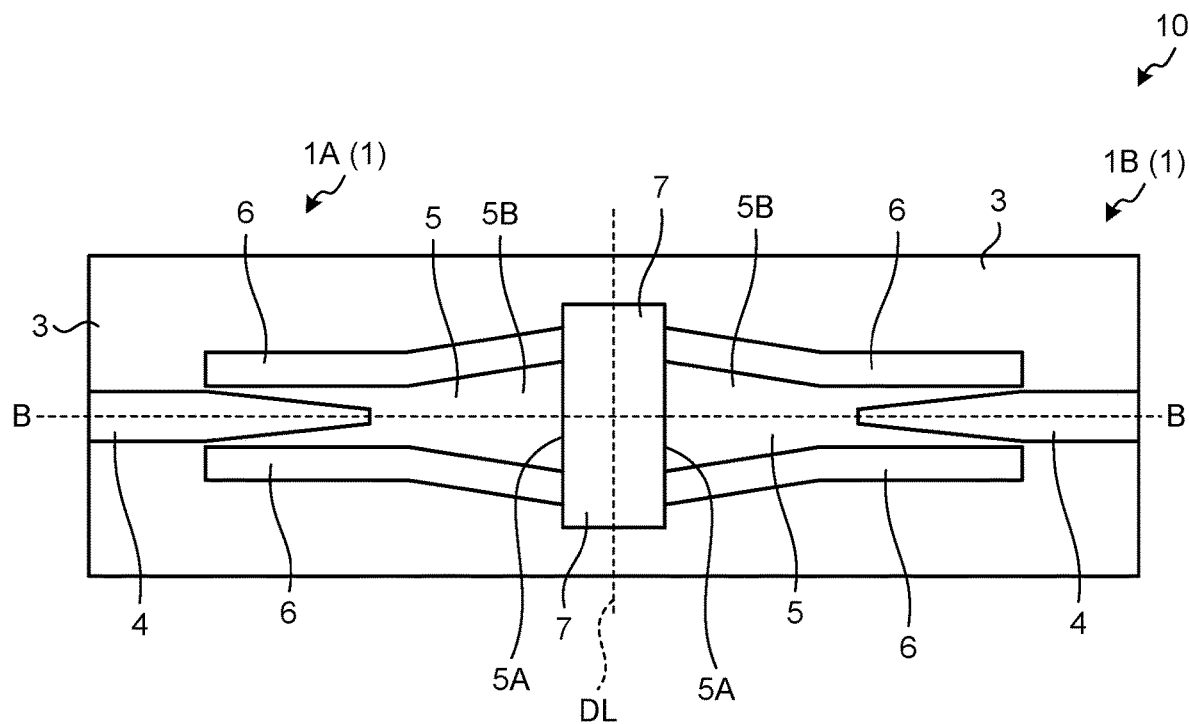
FIG. 4 is a schematic plan view of an optical integrated circuit wafer.
Figure 5:
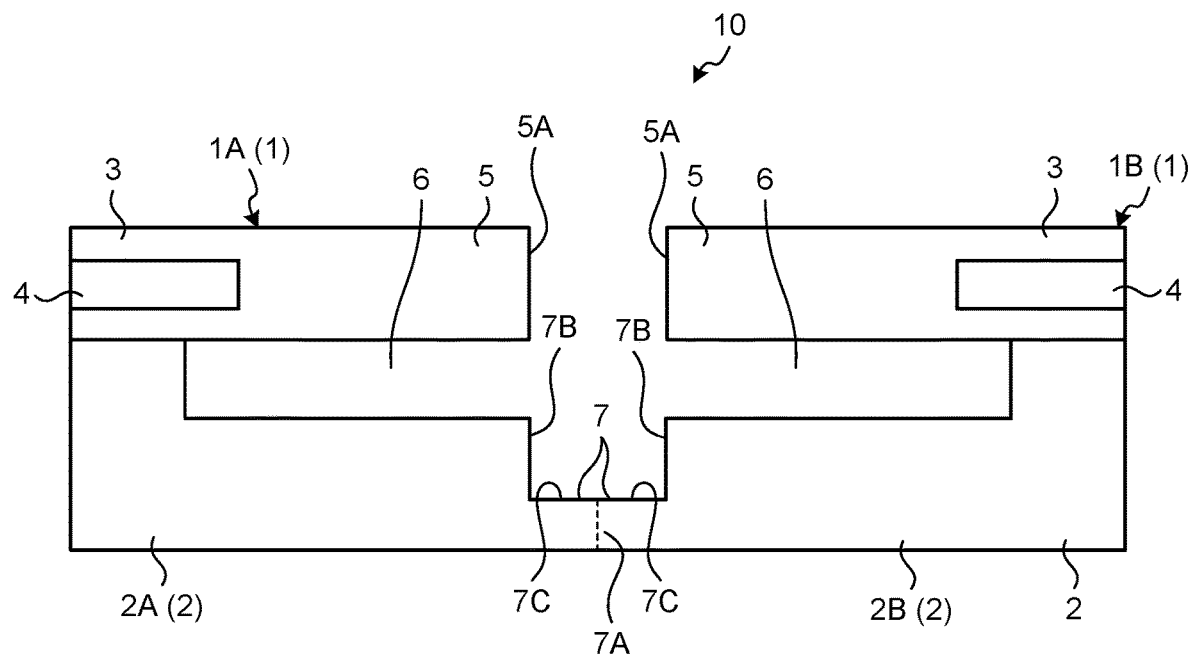
FIG. 5 is a cross-sectional view taken along line B-B of the optical integrated circuit wafer illustrated in FIG. 4.

The optical coupler 1 is able to be cut out from the optical integrated circuit wafer 10 by dicing the Si substrate 2 on the optical integrated circuit wafer 10 along the dicing line DL. Accordingly, the optical integrated circuit wafer 10 will be described. FIG. 4 is a schematic plan view of the optical integrated circuit wafer 10, and FIG. 5 is a cross-sectional view taken along line B-B of the optical integrated circuit wafer 10 illustrated in FIG. 4.

The optical integrated circuit wafer 10 illustrated in FIG. 4 includes the Si substrate 2 and a pair of the optical couplers 1 that are disposed on the Si substrate 2. The Si substrate 2 includes a first substrate 2A on which an optical couplers 1A that is one of the optical couplers 1 is disposed, a second substrate 2B on which an optical couplers 1B that is the other of the optical couplers 1 is disposed, a pair of the dent portions 7 that are formed at positions in the vicinity of the dicing line DL located between the first substrate 2A and the second substrate 2B.

The pair of the dent portions 7 is formed, on the Si substrate 2, in the vicinity of the dicing line DL that connects a portion between the one optical coupler 1A and the other optical coupler 1B. As a result, the output end surface 5A of the second optical waveguide 5 included in the one optical coupler 1A faces the output end surface 5A of the second optical waveguide 5 included in the other optical coupler 1B in a separated manner, and the width of the output end surface 5A of the second optical waveguide 5 is smaller than the core width of the SMF that is optically coupled to the output end surface 5A.

Figure 6:
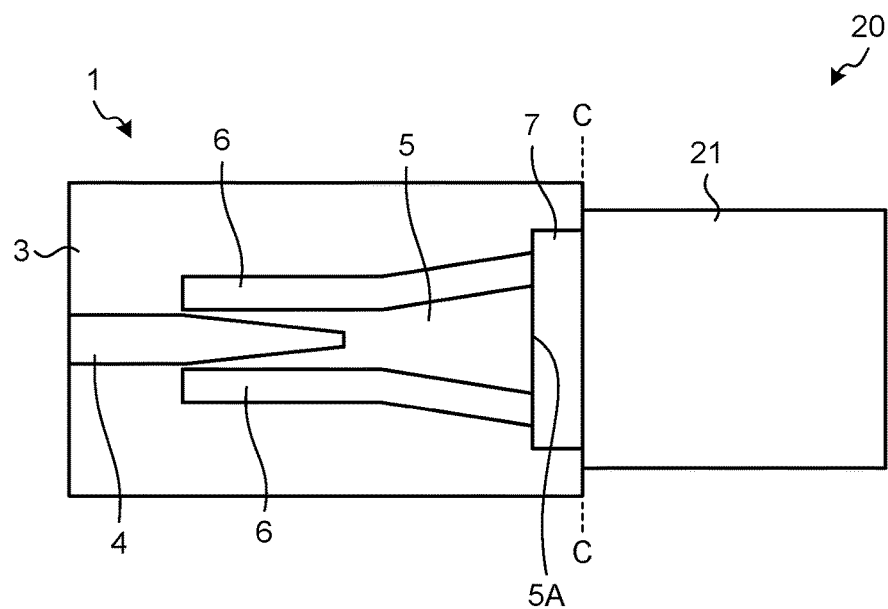
FIG. 6 is a schematic plan view of an optical fiber coupling structure.
Figure 7:
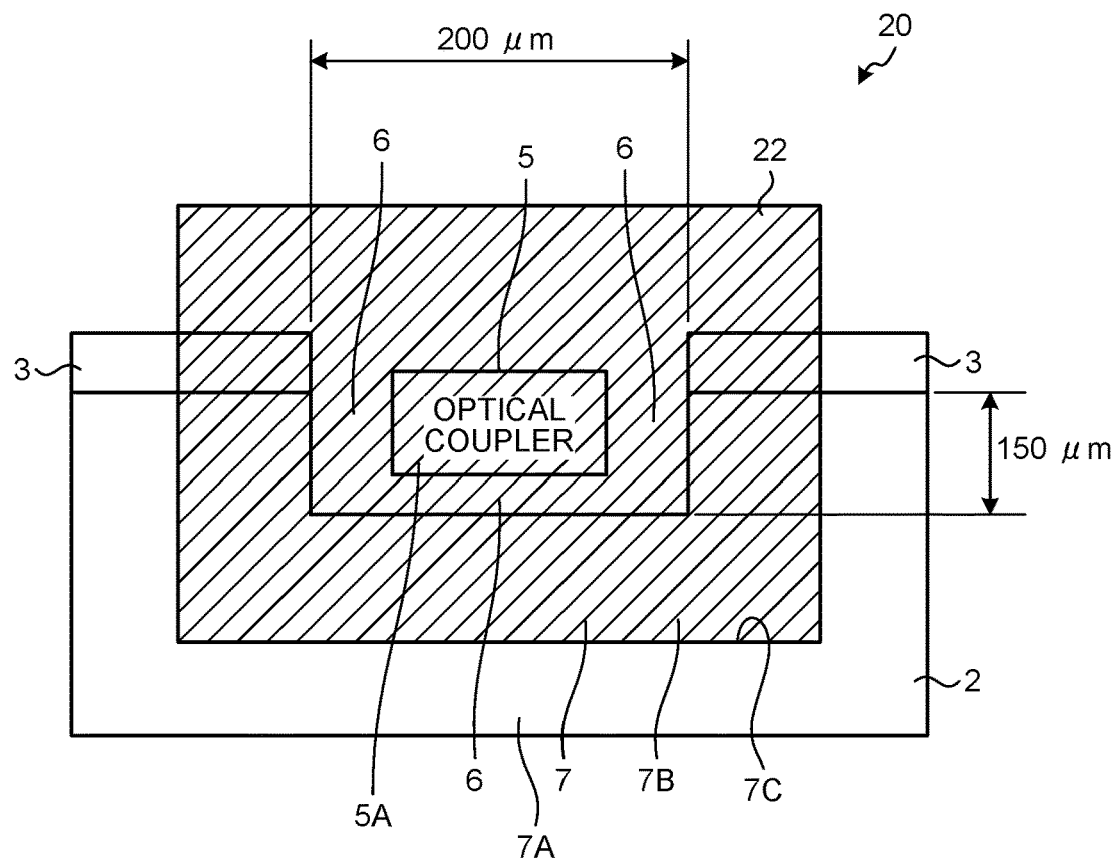
FIG. 7 is a cross-sectional view taken along line C-C of the optical fiber coupling structure illustrated in FIG. 6.

Then, an optical fiber coupling structure 20 in which optical coupling is performed on the optical fiber 21 with respect to the optical coupler 1 that has been cut out from the optical integrated circuit wafer 10 will be described. FIG. 6 is a schematic plan view of the optical fiber coupling structure 20, and FIG. 7 is a cross-sectional view taken along line C-C of the optical fiber coupling structure 20 illustrated in FIG. 6.

The optical fiber coupling structure 20 illustrated in FIG. 6 has a structure that performs optical coupling on a portion between the output end surface 5A of the second optical waveguide 5 and the optical fiber 21 via the capillary 22 included in the optical fiber 21 by filling an adhesive in a portion formed by the output end surface 5A of the second optical waveguide 5 and the dent portion 7.

Figure 8:
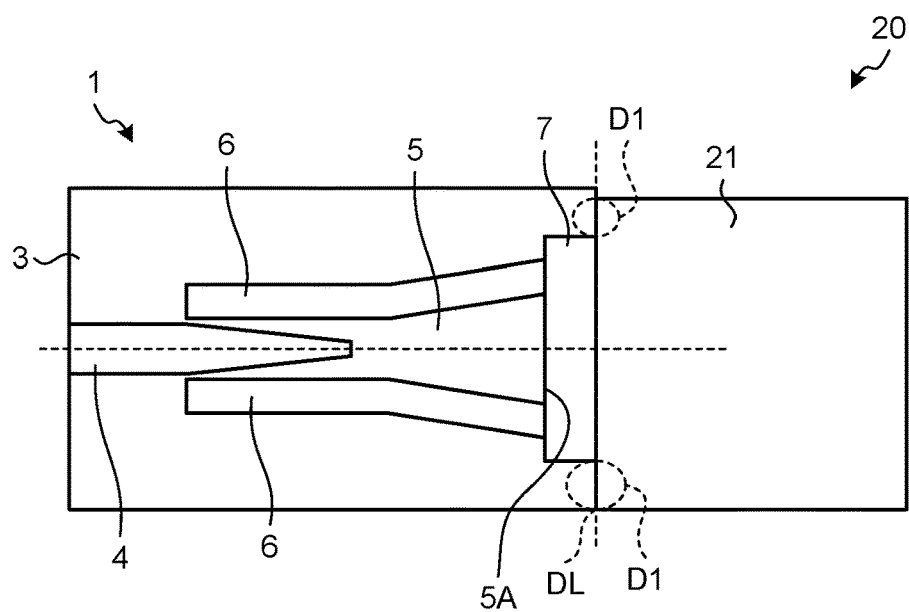
FIG. 8 is a schematic plan view of the optical fiber coupling structure.

FIG. 8 is a schematic plan view of the optical fiber coupling structure 20. On the surface on which the optical coupler 1 and the optical fiber 21 are optically coupled, a portion excluding the dent portion 7 corresponds to a contact surface D1, so that a contact area of the portion between the optical coupler 1 and the optical fiber 21 is increased and it is thus possible to firmly perform optical coupling between the optical coupler 1 and the optical fiber 21. As a result, the optical coupling between the optical coupler 1 and the optical fiber 21 is strengthened, so that it is possible to avoid a risk of rotation of the optical fiber 21.

Figure 9A:
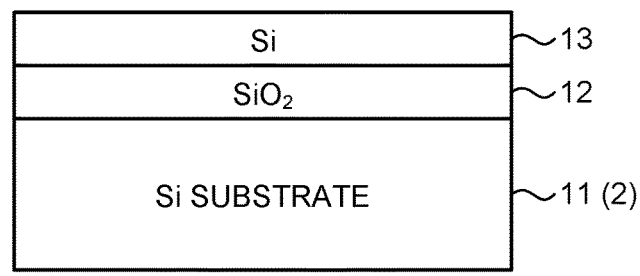
FIG. 9A is a diagram illustrating an example of a SOI substrate that is used for the optical integrated circuit wafer.

In the following, a method of manufacturing the optical coupler 1 will be described. FIG. 9A is a diagram illustrating an example of a silicon on insulator (SOI) substrate that is used for the optical integrated circuit wafer 10. The SOI substrate illustrated in FIG. 9A includes a Si substrate 11 (2), a $SiO_2$ layer 12 that is laminated on the Si substrate 11 and a Si layer 13 that is laminated on the $SiO_2$ layer 12. The $SiO_2$ layer 12 is a box layer. The Si layer 13 is a layer for forming the first optical waveguide 4 included in the optical coupler 1. In addition, the thickness of the Si substrate 11 is, for example, 750 μm; the thickness of the $SiO_2$ layer 12 is, for example, 2.5 μm; and the thickness of the Si layer 13 is, for example, 250 μm. In addition, for convenience of description, there may be a case in which the Si substrate 11 is not illustrated in the drawings except for some drawings. Furthermore, regarding the structure of the optical integrated circuit wafer 10, there may also be a structure that needs to, for example, a doping step or the like for a modulator, an optical received, or the like other than the optical fiber coupling structure; however, it is assumed that the step thereof is omitted.

Figure 9B:
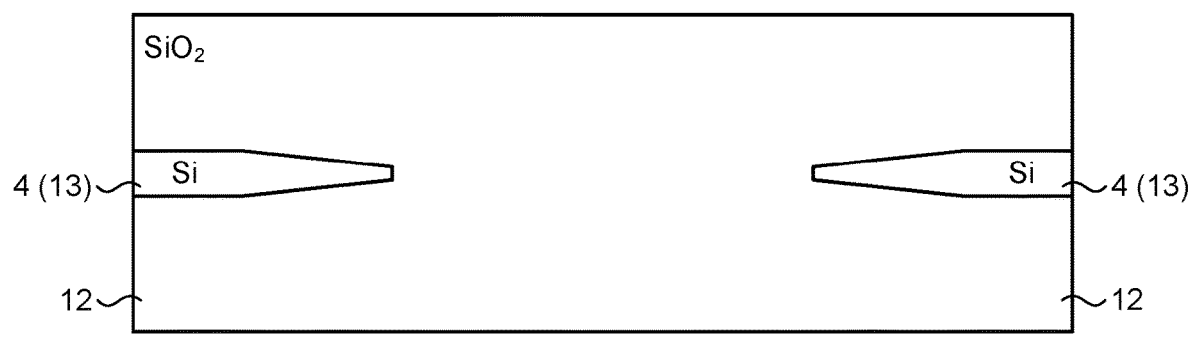
FIG. 9B is a diagram illustrating an example of a formation step of a first optical waveguide of the optical integrated circuit wafer.

FIG. 9B is a diagram illustrating an example of a formation step of the first optical waveguide 4 included in the optical integrated circuit wafer 10. On the $SiO_2$ layer 12 illustrated in FIG. 9B, the first optical waveguide 4 is formed by etching the Si layer 13 disposed on the $SiO_2$ layer 12. Specifically, a $SiO_2$ film 12A is formed by using a plasma CVD method, and a pattern of the first optical waveguide 4 is formed by using a photoresist. The pattern is formed such that the width of the first optical waveguide 4 is, for example, 460 nm, and the width of the leading end of the inverse tapered SSC is, for example, 140 nm. The pattern of the first optical waveguide 4 is formed by performing dry etching using this pattern as a mask. On the Si layer 13, the first optical waveguide 4 that has an inverse tapered SSC structure for increasing the mode diameter of the first optical waveguide 4 to the mode diameter of the second optical waveguide 5, and a Si optical waveguide 41 that guides light to the first optical waveguide 4 are formed.

Figure 9C:
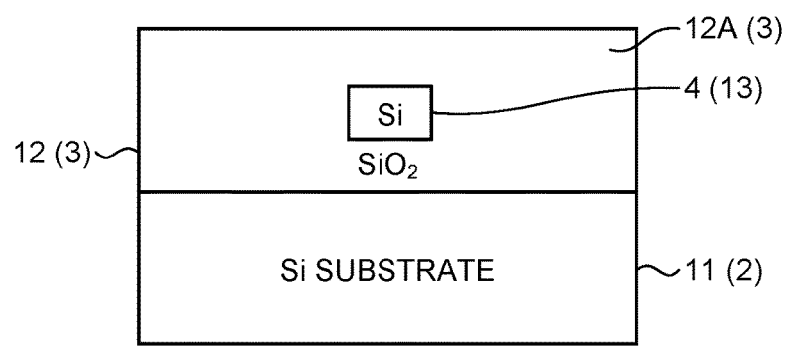
FIG. 9C is a diagram illustrating an example of a formation step of a clad layer of the optical integrated circuit wafer.

FIG. 9C is a diagram illustrating an example of a formation step of the clad layer 3 on the optical integrated circuit wafer 10. After the first optical waveguide 4 is formed on the $SiO_2$ layer 12, by forming the $SiO_2$ film 12A on the first optical waveguide 4 and the $SiO_2$ layer 12, the clad layer 3 of the $SiO_2$ layer 12 is formed on the Si substrate 11, as illustrated in FIG. 9C. Specifically, the clad layer 3 is formed by forming the $SiO_2$ film on the Si substrate 11 using the plasma CVD method. It is assumed that the thickness of the clad layer 3 is, for example, 5 um. The first optical waveguide 4 is formed in a state in which the first optical waveguide 4 is surrounded by the layer of $SiO_2$, and thus, light confined inside Si propagates through the waveguide due to a relative refractive index difference between Si and $SiO_2$.

Figure 10A:
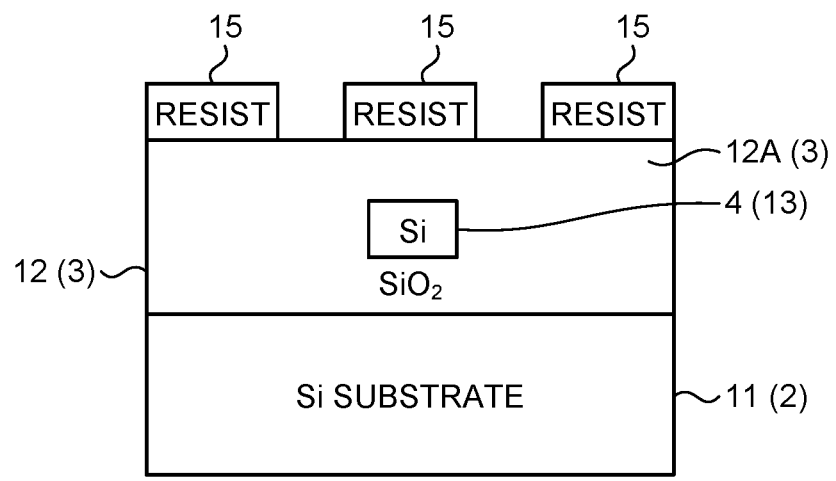
FIG. 10A is a diagram illustrating an example of a resist step when an optical coupler of the optical integrated circuit wafer is formed.

FIG. 10A is a diagram illustrating an example of a resist step at the time of formation of the optical coupler 1 included in the optical integrated circuit wafer 10. As illustrated in FIG. 10A, a photoresist layer 15 is disposed at the position in which a hollow cavity of the air layer 6 disposed on the clad layer 3 illustrated in FIG. 9C is formed.

Figure 10B:
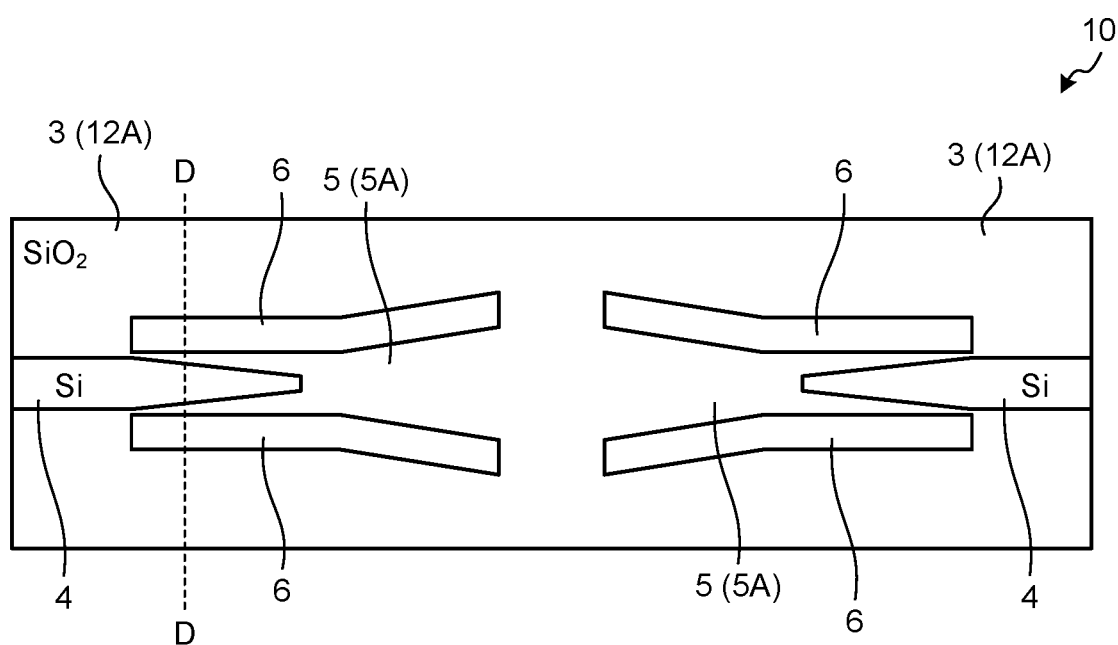
FIG. 10B is a schematic plan view of the optical integrated circuit wafer when the optical coupler is formed.
Figure 10C:
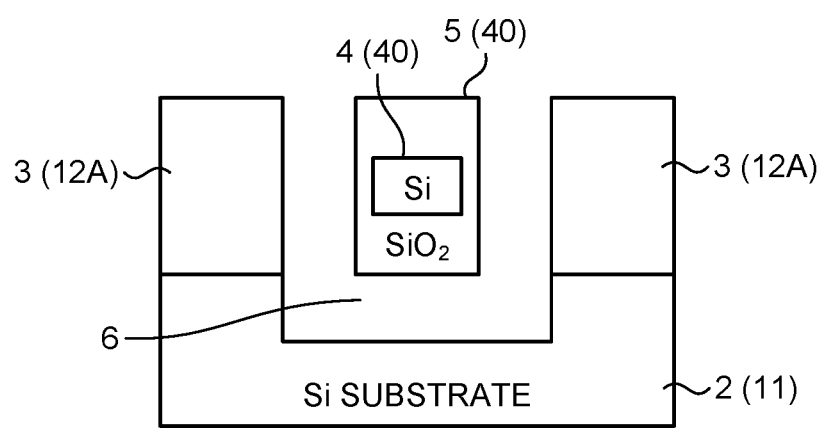
FIG. 10C is a cross-sectional view taken along line D-D of the optical integrated circuit wafer illustrated in FIG. 10B.

FIG. 10B is a schematic plan view of the optical integrated circuit wafer 10 at the time of formation of the optical coupler 1, and FIG. 10C is a cross-sectional view taken along line D-D of the optical integrated circuit wafer 10 illustrated in FIG. 10B. Regarding the optical integrated circuit wafer 10 illustrated in FIG. 10B, dry etching is performed on a part of the $SiO_2$ layer 12 and the Si layer 13 other than the portion that has been masked by the photoresist layer 15 disposed on the optical integrated circuit wafer 10 illustrated in FIG. 10A. Then, as a result of this dry etching, the air layer 6 that hollows out a portion around the optical waveguide 40 that includes the first optical waveguide 4 and the second optical waveguide 5. As a result, the pair of the optical couplers 1 having a hollow form is formed on the optical integrated circuit wafer 10. Specifically, by performing dry etching on the $SiO_2$ layer 12 by using this pattern as a mask, and by subsequently performing wet etching on the Si substrate 11, a hollow structure in which a portion around the $SiO_2$ layer 12 is surrounded by the air layer 6 is formed. The structure is functioned as the optical coupler 1 due to the relative refractive index difference between the $SiO_2$ layer 12 and the air layer 6.

Figure 11A:
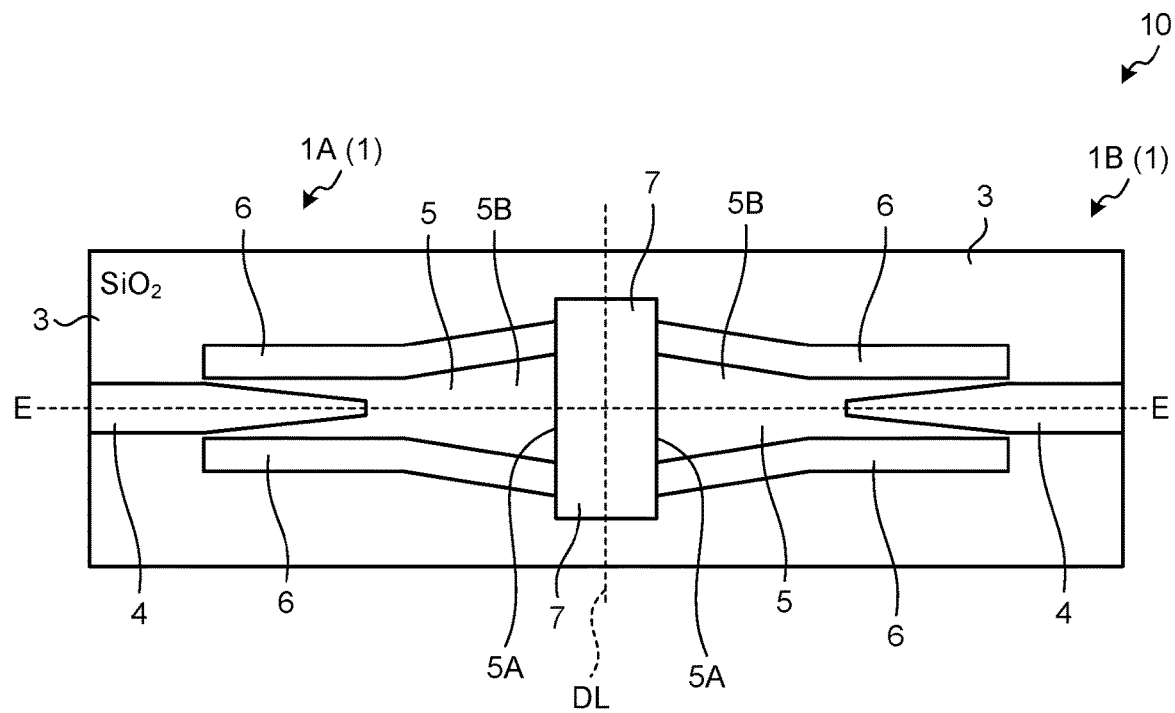
FIG. 11A is a schematic plan view of the optical integrated circuit wafer after completion.

FIG. 11A is a schematic plan view of the optical integrated circuit wafer 10 after the completion. On the optical integrated circuit wafer 10, the pair of the dent portions 7 is formed on the Si substrate 11 by etching the Si substrate 11 in the vicinity of the output end surface 5A of the second optical waveguide 5 included in the optical coupler 1. The depth D of the dent portion 7 is, for example, 30 μm; the width w of the dent portion 7 is, for example, 200 μm; and the height h of the dent portion 7 is, for example, 100 μm.

Figure 11B:
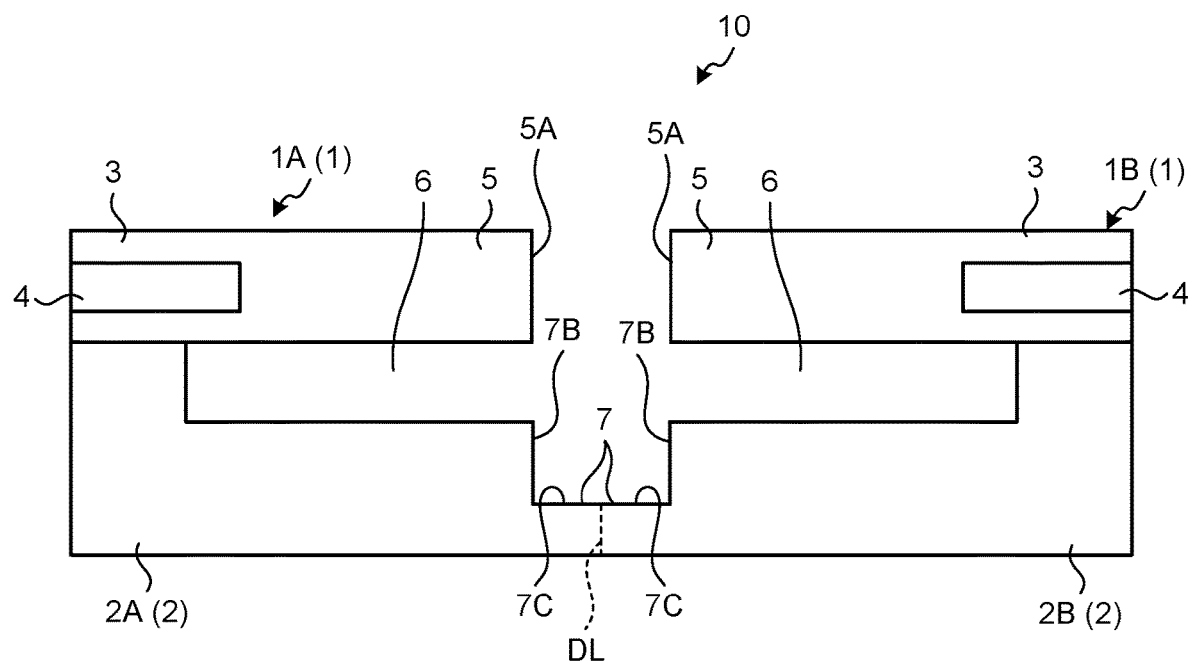
FIG. 11B is a cross-sectional view taken along line E-E of the optical integrated circuit wafer illustrated in FIG. 11A after the completion.

FIG. 11B is a cross-sectional view taken along line E-E of the optical integrated circuit wafer 10 illustrated in FIG. 11A after the completion. Regarding the optical integrated circuit wafer 10 illustrated in FIG. 11B, the pair of the optical couplers 1 illustrated in FIG. 1 is able to be cut out by dicing the dicing line DL that is included in the dent portion 7 and that is formed on the Si substrate 11 (2). In addition, dicing is implemented by, for example, stealth dicing performed by using laser, blade dicing, scribing, or the like.

The optical coupler 1 according to the first embodiment includes the first optical waveguide 4 and the second optical waveguide 5 that has a relative refractive index difference that is smaller than that of the first optical waveguide 4 and that is optically coupled to the first optical waveguide 4. The optical coupler 1 includes the dent portion 7 that is formed in the vicinity of the dicing line DL located on the Si substrate 2 such that the width of the dent portion 7 including the output end surface 5A is smaller than the width of the glass block of the optical fiber 21 in the state in which the output end surface 5A protrudes farther than the dicing end surface 7A in the axial direction of the optical waveguide 40. As a result, it is possible to suppress an optical coupling loss at the time of optical coupling with the optical fiber 21. A connection with the optical fiber 21 that has the normal diameter is possible, so that it is possible to implement a large tolerance curve. Furthermore, regarding the wall surface 7B of the dent portion 7 on the Si substrate 2 included in the optical coupler 1, it is possible to ensure high reliability by suppressing a rotation of the optical fiber 21 due to expansion and contraction of the adhesive by increasing the contact area at the time of optical coupling performed on the optical fiber 21.

The optical coupler 1 converts the mode diameter to the mode diameter of the optical fiber 21 in accordance with the travelling of the light from the first optical waveguide 4 to the second optical waveguide 5. As a result, it is possible to perform optical coupling between the optical coupler 1 and optical fiber that is the SMF.

The width w of the dent portion 7 included in the optical coupler 1 is calculated on the basis of $w \geq 2d^*(\lambda/\pi D)$. As a result, the dent portion 7 is able to be increased to a degree in which the light that is emitted from the output end surface 5A of the second optical waveguide 5 included in the optical coupler 1 and that radially spreads is not blocked.

The height h of the dent portion 7 of the optical coupler 1 is calculated on the basis of $h \geq d^*(\lambda/\pi D)$. As a result, the dent portion 7 is able to be increased to a degree in which the light that is emitted from the output end surface 5A of the second optical waveguide 5 included in the optical coupler 1 and that radially spreads is not blocked.

The optical coupler 1 is constructed by filling an adhesive in a portion formed by the output end surface 5A of the second optical waveguide 5 and the dent portion 7 and performs optical coupling on the optical fiber 21 with respect to the output end surface 5A of the second optical waveguide 5. As a result, the optical coupler 1 is able to perform optical coupling on the optical fiber 21.

On the optical integrated circuit wafer 10, the pair of the optical couplers 1 each having the same structure is disposed on the Si substrate 2 in the state in which the optical couplers 1 face with each other in a separated manner at a position of the dicing line DL. As a result, it is possible to cut out the pair of the optical couplers 1 from the optical integrated circuit wafer 10 by dicing the dicing line DL.

In the conventional optical integrated circuit wafer 110A, in order not to damage the optical coupler 100 caused by a dicing process, the dent portion 109 is disposed so as to protrude than the leading end of the $SiO_2$ waveguide 106 included in the hollow coupler. Therefore, the contact surface is an asymmetric structure in the case where the portion of the dent portion 109 is subjected to dicing and the dicing end surface 101A is then brought into contact with the capillary 123 included in the optical fiber 121, so that the optical axis is shifted due to a rotation of the optical fiber 121 caused by swelling, expansion, and contraction of the adhesive.

In contrast, regarding the optical integrated circuit wafer 10 according to the embodiment, the width of the dent portion 7 is limited and is not increased to the width of the capillary 22 of the optical fiber 21, so that a certain portion of the dicing end surface 7A that is located between the bottom surface and the surface of the chip and that is able to be adhered to the capillary 22 is positioned on the both ends of the dent portion 7. Accordingly, in the case where the subject portion and the capillary 22 included in the optical fiber 21 are adhered by using an adhesive, it is possible to avoid a rotation of the optical fiber 21 even if the adhesive that enters the dent portion 7 is swollen, expanded, and contracted due to heat. In other words, it is possible to suppress an optical coupling loss caused by a shift of the optical axis. Furthermore, the adhesive strength is increased as a result of the contact area between the capillary 22 included in the optical fiber 21 and the dicing end surface 7A is increased as compared to the contact area used in the conventional structure. Accordingly, it is possible to increase a contact area between the optical fiber 21 and the dicing end surface 7A of the optical integrated circuit wafer 10 while using the optical coupler 1 that enables a connection with the optical fiber 21 having the normal diameter. As a result, it is possible to suppress the optical coupling loss by suppressing the rotation of the optical fiber 21 due to expansion and contraction of the adhesive.

Furthermore, for convenience of description, a case has been described above as an example in which the material of the first optical waveguide 4 is Si and the material of the second optical waveguide 5 is SiO$_2$; however, the materials are not limited to those described above. For example, SiN, SiON, or the like may be used, and appropriate modifications are possible as long as the refractive index of the first optical waveguide 4 is greater than that of the second optical waveguide 5. The material of the first optical waveguide 4 is a material that includes Si, and the material of the second optical waveguide 5 is a material that includes Si and that has a smaller specific refractive index than that of the first optical waveguide 4. In addition, the material of the first optical waveguide 4 is a material that includes, for example, Si, SiN, SiON, SiO$_2$, or the like. In some cases, there may be a structure that converts a Si waveguide to a SiN waveguide immediately before the SiN waveguide in the case where the material used for the first optical waveguide 4 is SiN and the material used for the second optical waveguide 5 is SiO$_2$.

A case has been described as an example in which, in the optical coupler 1, the optical waveguide 40 that has the hollow structure and that is formed by the air layer 6 whose circumference is a hollow cavity; however, an optical waveguide whose circumference is filled with an adhesive may be used instead of the air layer 6, and appropriate modifications are possible.

Furthermore, a case has been described as an example in which the dent portion 7 is formed such that the orientation of the output end surface 5A of the second optical waveguide 5 included in the optical coupler 1 according to the first embodiment is the same as the orientation of the dicing end surface 7A on the Si substrate 2. However, the orientation of the output end surface 5A of the second optical waveguide 5 is not limited to this. The orientation of the output end surface 5A of the optical coupler 1 may be different from the orientation of the dicing end surface 7A, and the embodiment thereof will be described below as a second embodiment. In addition, by assigning the same reference numerals to components having the same configuration as those in the optical coupler 1 according to the first embodiment, overlapped descriptions of the configuration and the operation thereof will be omitted.

[b] Second Embodiment

Figure 12:
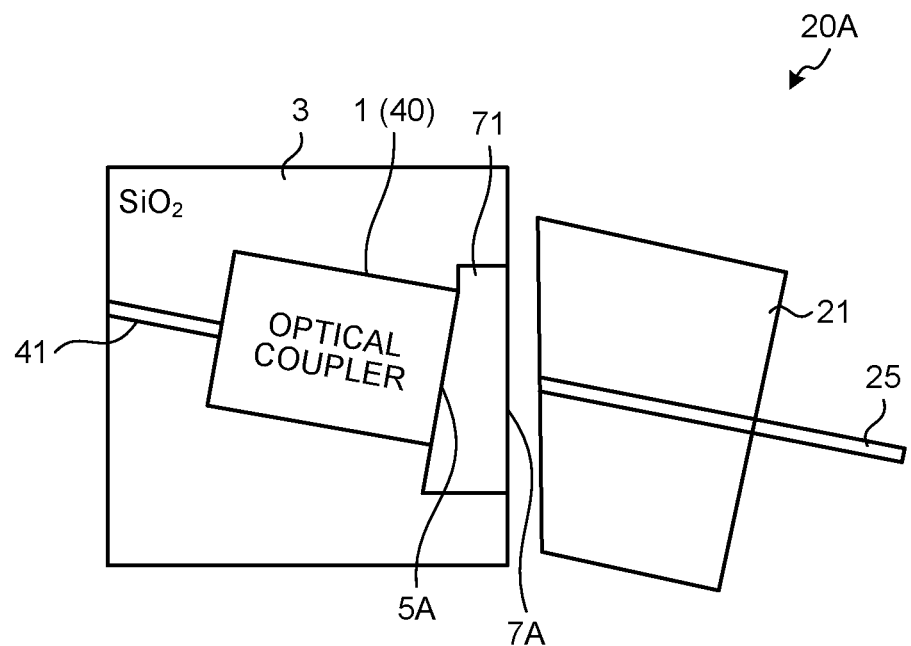
FIG. 12 is a schematic plan view illustrating an example of an optical fiber coupling structure according to a second embodiment.

FIG. 12 is a schematic plan view illustrating an example of an optical fiber coupling structure 20A according to the second embodiment. The optical coupler 1 is disposed on the Si substrate 2 such that the orientation of the output end surface 5A included in the second optical waveguide 5 is inclined relative to the orientation of the dicing end surface 7A. Then, a dent portion 71 is formed in the vicinity of the dicing line DL that is located on the Si substrate 2 at a position between the output end surface 5A and the dicing end surface 7A.

With the optical fiber coupling structure 20A, it is possible to perform optical coupling at a portion between the output end surface 5A of the second optical waveguide 5 and the optical fiber 21 via the capillary 22 attached around the core 25 of the optical fiber 21 by filling an adhesive in a portion formed by the dent portion 71 and the output end surface 5A of the second optical waveguide 5.

Furthermore, a case has been described as an example in which the dent portion 7 is formed such that the orientation of the output end surface 5A of the second optical waveguide 5 included in the optical coupler 1 according to the first embodiment is the same as the orientation of the dicing end surface 7A on the Si substrate 2. However, the orientation of the dicing end surface 7A is not limited to this, and the embodiment thereof will be described below as a third embodiment.

[c] Third Embodiment

Figure 13:
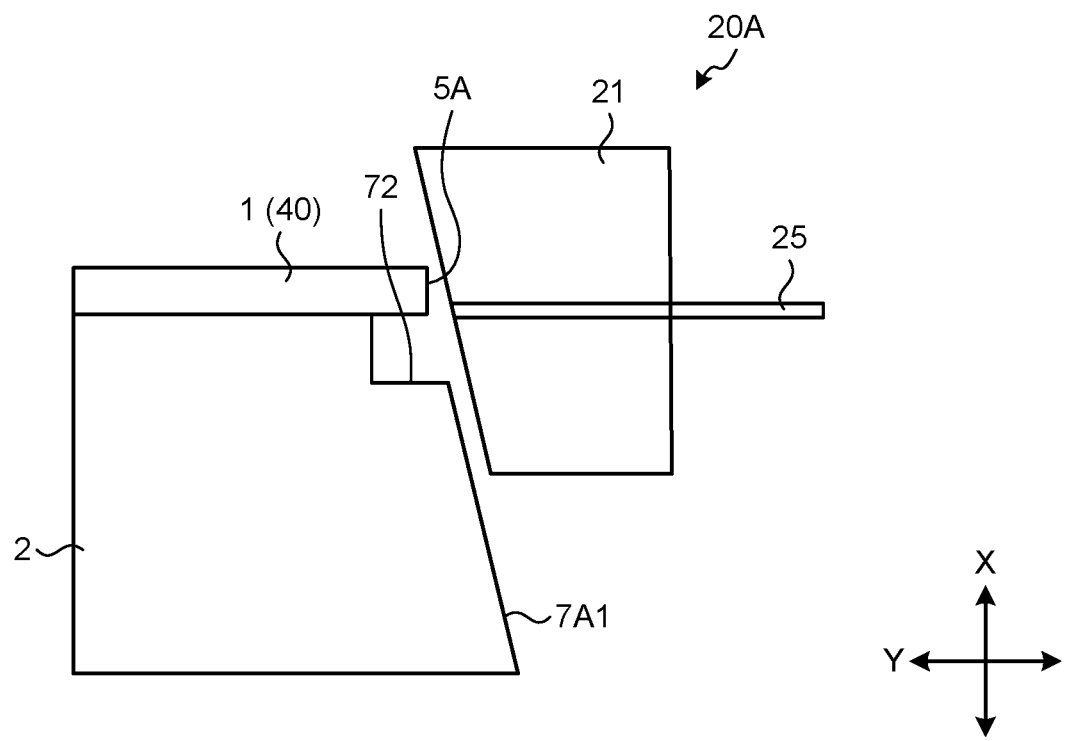
FIG. 13 is a cross-sectional view of an optical fiber coupling structure according to a third embodiment.

FIG. 13 is a cross-sectional view of the optical fiber coupling structure 20A according to the third embodiment. On the Si substrate 2, a dicing end surface 7A1 that is diagonally inclined from the perpendicular direction Y that is orthogonal to the axial direction X of the optical waveguide 40 is formed. A dent portion 72 is formed in the vicinity of the dicing line DL on the Si substrate 2 located between the output end surface 5A and the dicing end surface 7A1.

Regarding the optical fiber coupling structure 20A, it is possible to perform optical coupling at a portion between the output end surface 5A of the second optical waveguide 5 and the optical fiber 21 via the capillary 22 attached around the core 25 of the optical fiber 21 by filling an adhesive in a portion formed by the dent portion 72 and the output end surface 5A of the second optical waveguide 5.

[d] Fourth Embodiment

Figure 14:
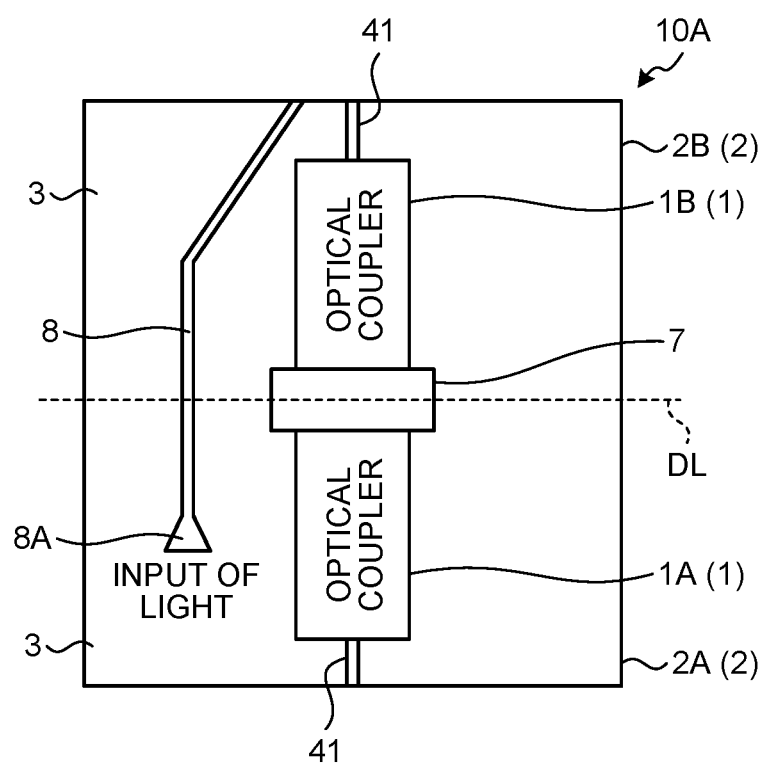
FIG. 14 is a schematic plan view of an optical integrated circuit wafer according to a fourth embodiment.

FIG. 14 is a schematic plan view of an optical integrated circuit wafer 10A according to a fourth embodiment. The Si substrate 2 illustrated in FIG. 14 includes the first substrate 2A on which the one optical coupler 1A is disposed, the second substrate 2B on which the other optical coupler 1B is disposed, and the dent portion 7 that is formed in the vicinity of the dicing line DL located at a portion between the first substrate 2A and the second substrate 2B.

The optical integrated circuit wafer 10A includes a routed optical waveguide 8 that is disposed on the first substrate 2A and the second substrate 2B across the dicing line DL so as to be parallel to the optical waveguide 40 included in the one optical coupler 1A and the optical waveguide 40 included in the other optical coupler 1B. The routed optical waveguide 8 is an optical waveguide that includes, for example, an input unit 8A that receives an input of test light.

Furthermore, by limiting the width of the dent portion 7, a degree of freedom of routing the waveguide that is used to test a wafer before a dicing process is performed. With the conventional optical integrated circuit wafer 110A, in order to simplify a dicing process, the dent portion 109 is provided in the whole area of the dicing line DL, so that the optical waveguide is not able to be routed in the section of the dent portion 109. In contrast, with the optical integrated circuit wafer 10A according to the present embodiment, the width of the dent portion 7 is limited, and it is thus possible to route the routed optical waveguide 8 across the dicing line DL other than the dent portion 7, so that the routed optical waveguide 8 can be used as long as the dicing process has not yet been performed.

[e] Fifth Embodiment

Figure 15:
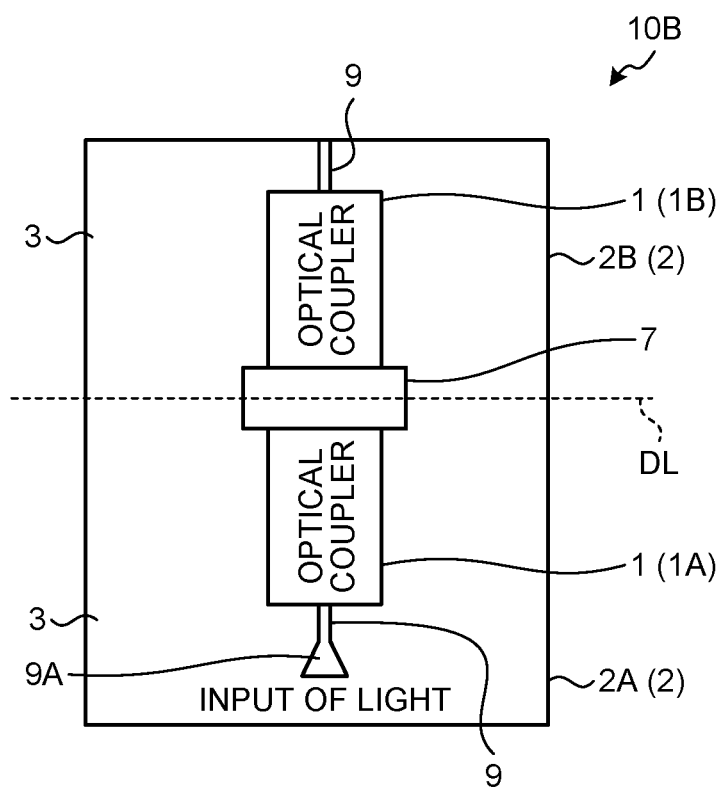
FIG. 15 is a schematic plan view of an optical integrated circuit wafer according to a fifth embodiment.

FIG. 15 is a schematic plan view of an optical integrated circuit wafer 10B according to a fifth embodiment. The Si substrate 2 illustrated in FIG. 15 includes the first substrate 2A on which the one optical coupler 1A is disposed, the second substrate 2B on which the other optical coupler 1B is disposed, and the dent portion 7 that is disposed in the vicinity of the dicing line DL located at a portion between the first substrate 2A and the second substrate 2B. The optical integrated circuit wafer 10B includes a routed waveguide 9 that passes through from the one optical coupler 1A to the other optical coupler 1B by way of the dent portion 7 across the dicing line DL. The routed waveguide 9 is an optical waveguide that receives an input of test light. The routed waveguide 9 has a termination 9A.

As a light incident method that does not use an optical end surface, there is a grating coupler that is used to input light from a chip surface of the optical integrated circuit wafer 10B. In the case of the grating coupler, an optical measurement is possible before a dicing process is performed; however, if the grating coupler is put inside a manufactured chip, a chip area is increased. Accordingly, in order to prevent an increase in the chip area, the grating coupler is disposed outside the manufactured chip and is used as a discard port at the time of the dicing process. By limiting the width of the dent portion 7, the waveguide is also able to be routed from the dicing line DL on the optical end surface, and thus, the degree of freedom is increased.

[f] Sixth Embodiment

Figure 16:
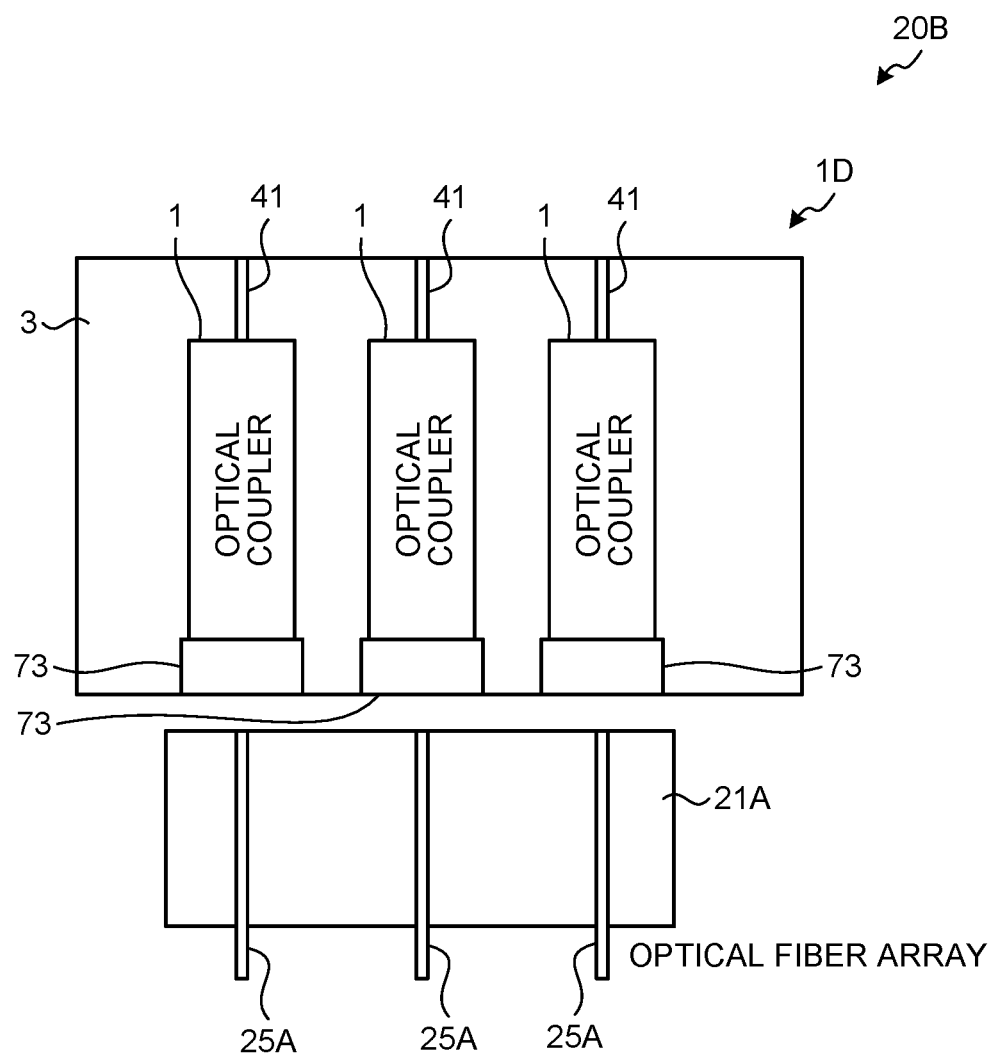
FIG. 16 is a schematic plan view of an optical fiber coupling structure according to a the sixth embodiment.
Figure 17:
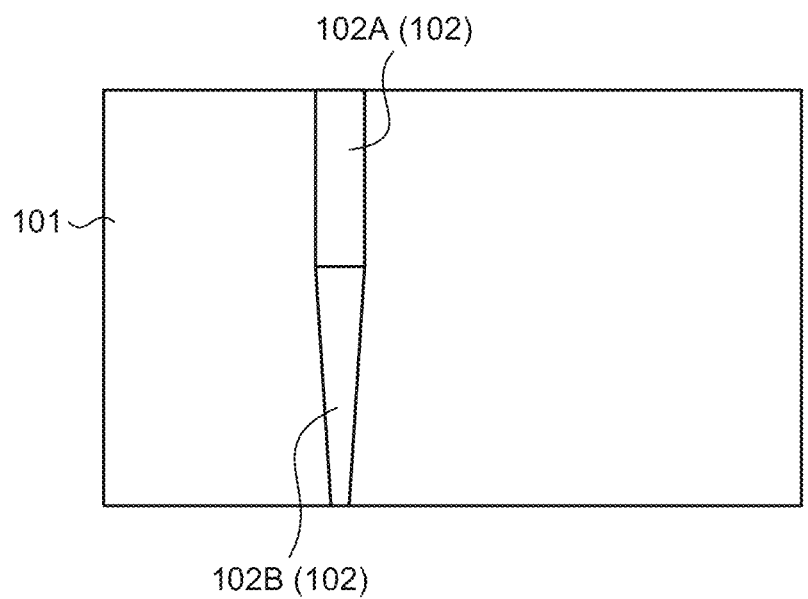
FIG. 17 is a schematic plan view of an inverse tapered SSC structure.
Figure 18:
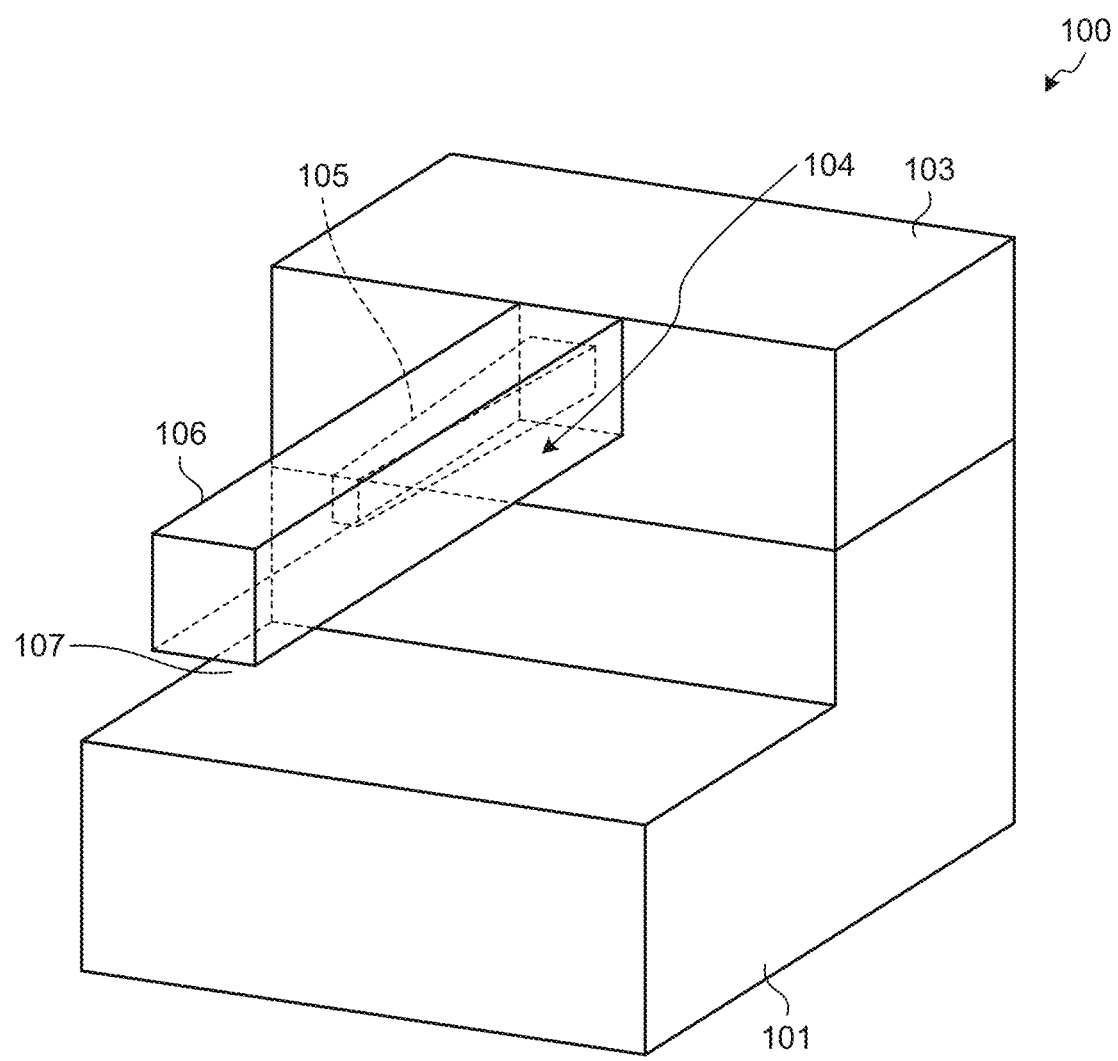
FIG. 18 is a perspective view illustrating an example of an optical coupler having a hollow structure.
Figure 19:
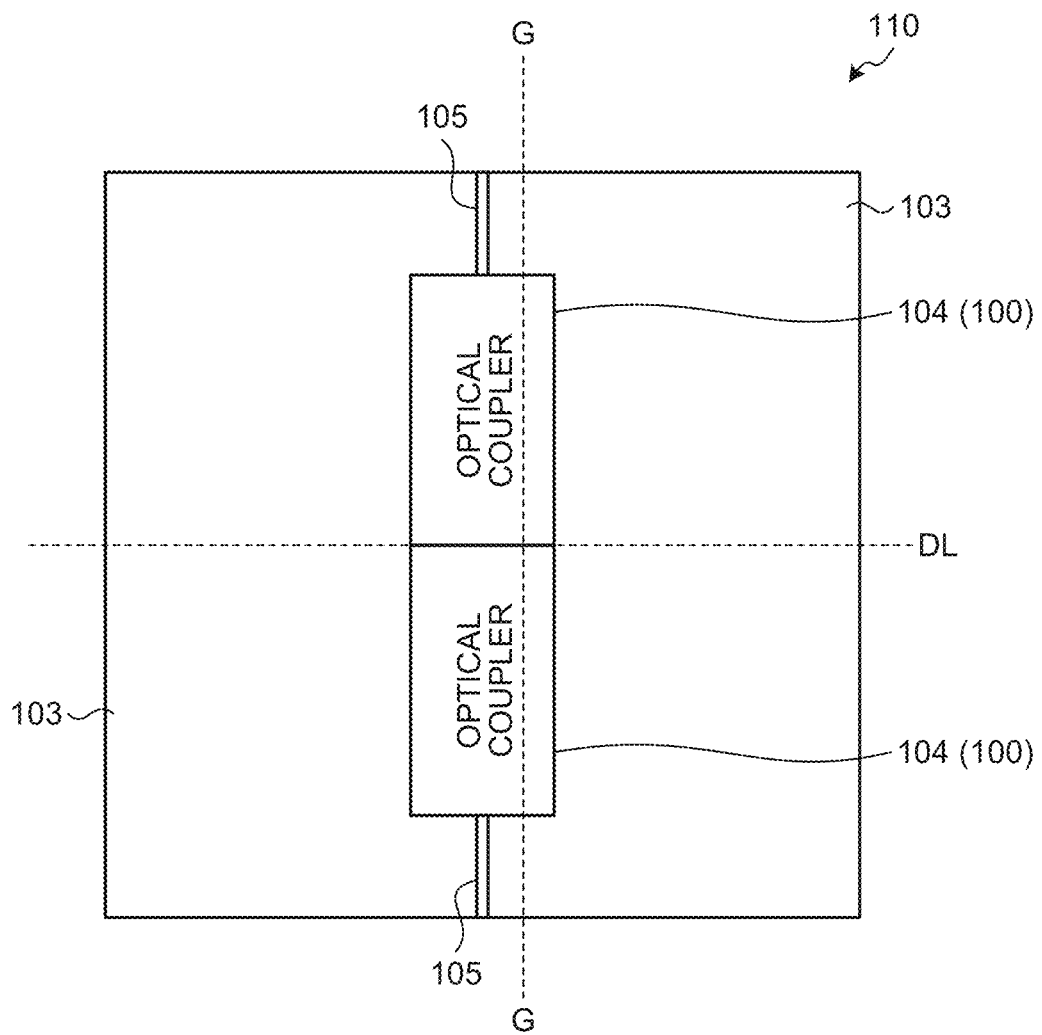
FIG. 19 is a schematic plan view illustrating an example of an optical integrated circuit wafer.
Figure 20:
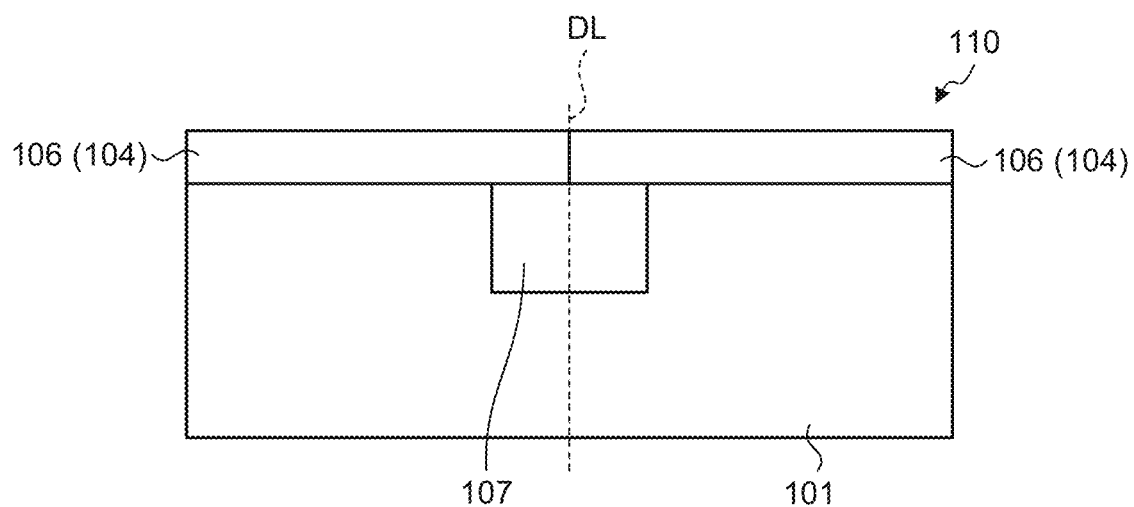
FIG. 20 is a cross-sectional view taken along line G-G of the optical integrated circuit wafer illustrated in FIG. 19.
Figure 21:
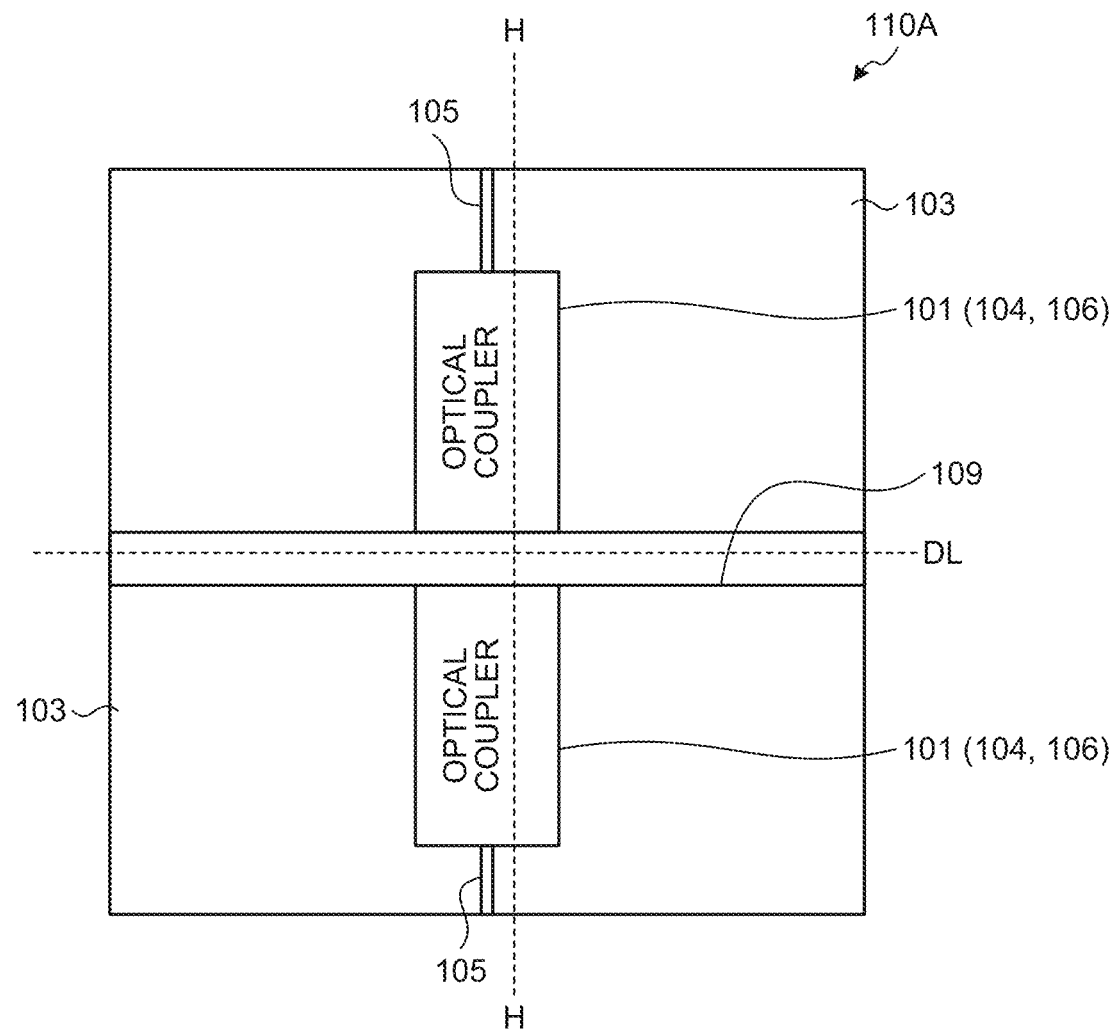
FIG. 21 is a schematic plan view illustrating an example of the optical integrated circuit wafer.
Figure 22:
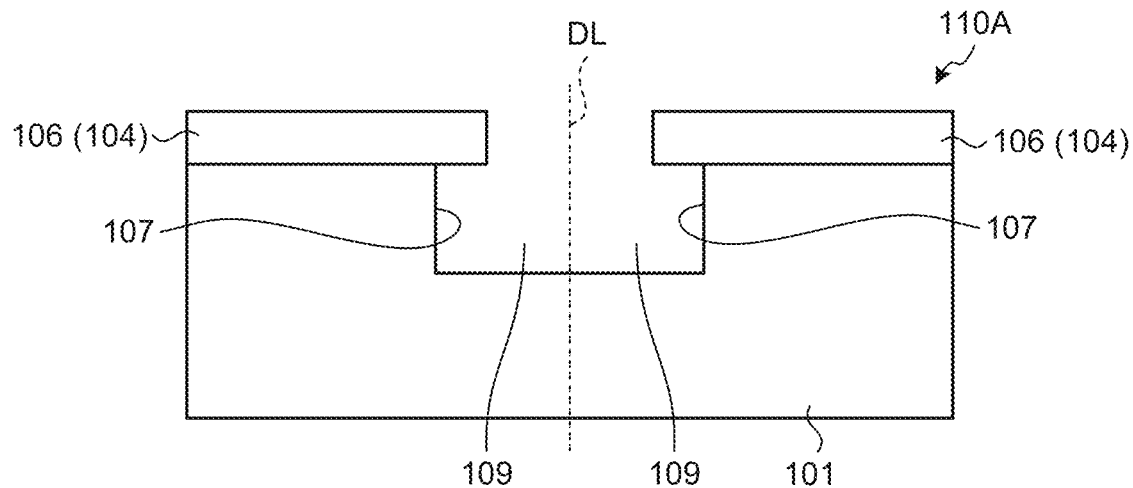
FIG. 22 is a cross-sectional view taken along line H-H of the optical integrated circuit wafer illustrated in FIG. 21.
Figure 23:
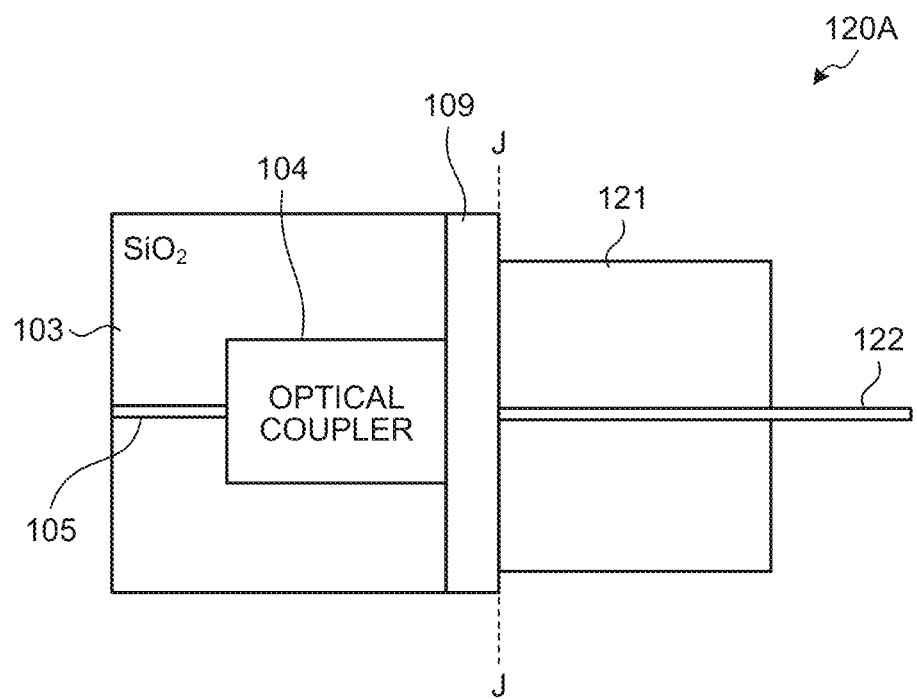
FIG. 23 is a schematic plan view illustrating an example of an optical fiber coupling structure.
Figure 24:
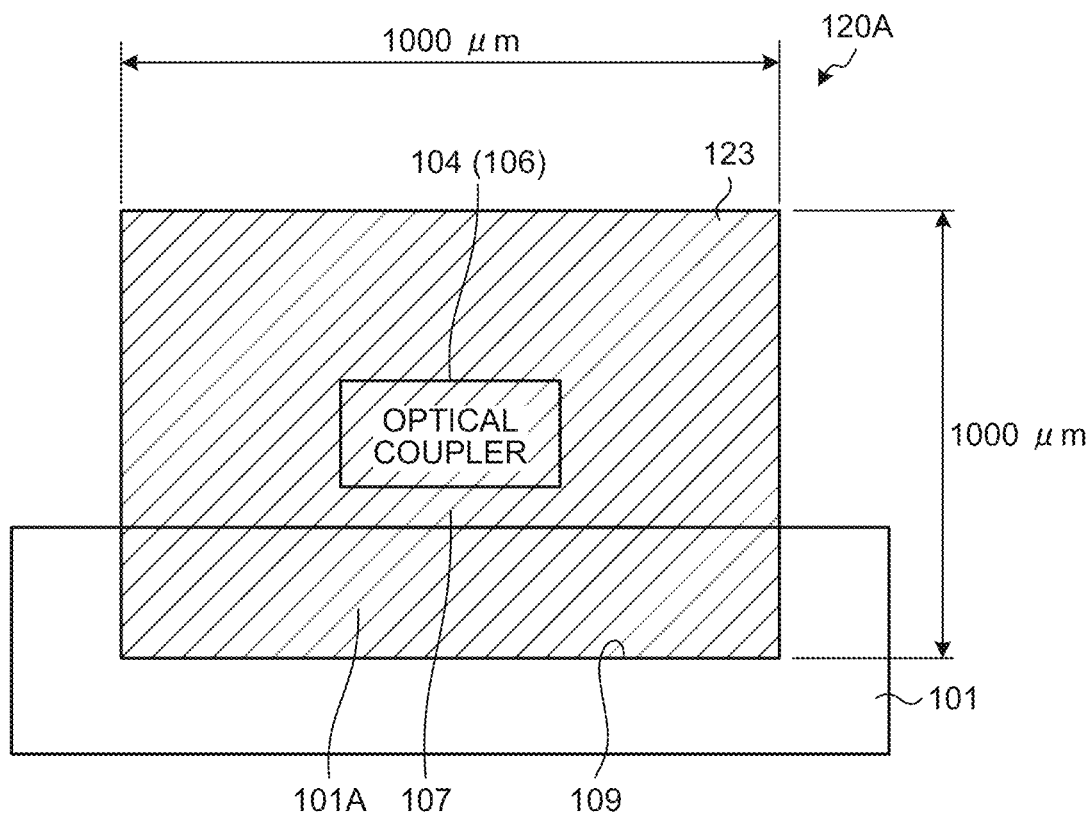
FIG. 24 is a cross-sectional view taken along line J-J of the optical fiber coupling structure illustrated in FIG. 23.
Figure 25:
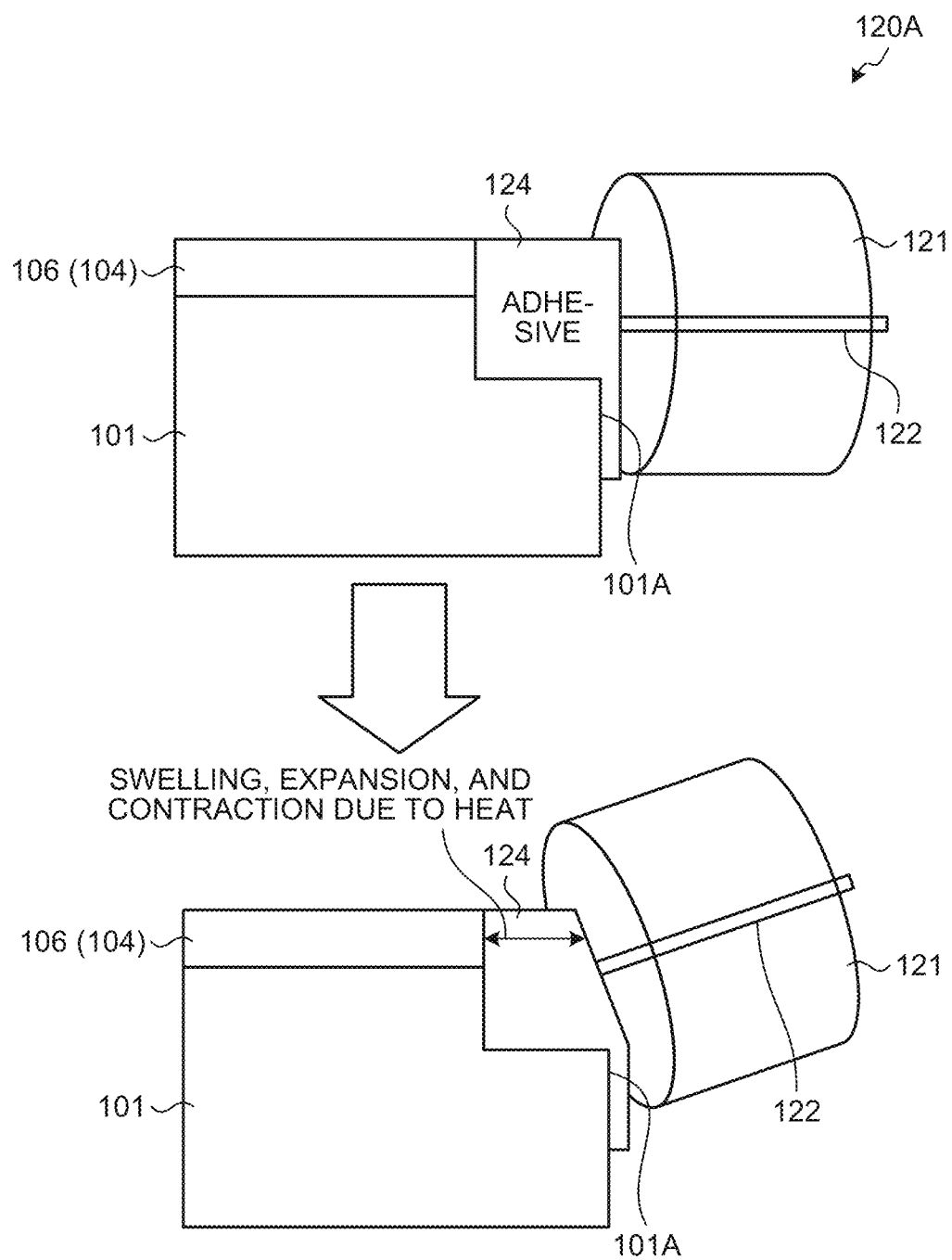
FIG. 25 is a diagram illustrating an example of a problem of the optical fiber coupling structure.

FIG. 16 is a schematic plan view of an optical fiber coupling structure 20B according to a sixth embodiment. In addition, by assigning the same reference numerals to components having the same configuration as those in the optical coupler 1 according to the first embodiment, overlapped descriptions of the configuration and the operation thereof will be omitted. The optical fiber coupling structure 20B illustrated in FIG. 16 includes the Si substrate 2, the three optical couplers 1(1D) that are disposed on the Si substrate 2, three dent portions 73, and an optical fiber array 21A that includes three cores 25A. On the Si substrate 2, each of the dent portions 73 is formed at intervals of the optical couplers 1.

The optical fiber coupling structure 20B has a structure that performs optical coupling at a portion between each of the output end surfaces 5A included in the respective second optical waveguides 5 and the cores 25A of the optical fiber array 21A via the capillary 22 by filling an adhesive in a portion formed by the dent portions 73 and the output end surfaces 5A of the respective second optical waveguides 5 included in the optical coupler 1. In other words, it is possible to perform optical coupling between the second optical waveguides 5 included in the respective three optical couplers 1 and the three cores 25A included in the optical fiber array 21A.

Each of the components in the units illustrated in the drawings is not always physically configured as illustrated in the drawings. In other words, the specific shape of a separate or integrated unit is not limited to the drawings; however, all or part of the unit can be configured by functionally or physically separating or integrating any of the units depending on various kinds of loads or use conditions.

According to an aspect of an embodiment, it is possible to suppress an optical coupling loss at the time of coupling to an optical fiber.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical integrated device comprising:
a substrate; and
an optical waveguide that is disposed on the substrate and that has a hollow structure, wherein
the optical waveguide includes
a first optical waveguide, and
a second optical waveguide that is optically coupled to the first optical waveguide and that has a relative refractive index difference that is smaller than a relative refractive index difference of the first optical waveguide, and
the optical waveguide converts a mode diameter to a mode diameter of an optical fiber in accordance with travelling of light from the first optical waveguide to the second optical waveguide, and
the optical integrated device includes a dent portion that is formed in a vicinity of a dicing line on the substrate such that a width of the dent portion including an output end surface of the second optical waveguide is smaller than a width of a glass block of the optical fiber that is optically coupled to the output end surface, the dent portion being formed in a state in which a dicing end surface of the substrate protrudes farther than the output end surface of the second optical waveguide in an axial direction of the optical waveguide, and the dent portion having a width calculated by Equation 1 below:

$w \geq 2d^*(\lambda/\pi D)$ $\lambda$: a wavelength,
d: a depth of the dent portion,
w: a width of the dent portion
(w<a diameter of the leading end of the glass block of the fiber), and
D: a mode diameter.

2. The optical integrated device according to claim 1, wherein the dent portion has the height calculated by Equation 2 below:

$h \geq d^*(\lambda/\pi D)$ [Equation 2]

$\lambda$: the wavelength,
d: the depth of the dent portion,
h: a height of the dent portion, and
D: the mode diameter, $h \geq d^*(\lambda/\pi D)$ $\lambda$: the wavelength,
d: the depth of the dent portion,
h: a height of the dent portion, and
D: the mode diameter.

3. The optical integrated device according to claim 1, wherein
a material of the first optical waveguide is a material that includes Si, and
a material of the second optical waveguide is a material that includes Si and that has a specific refractive index that is smaller than a specific refractive index of the material used for the first optical waveguide.

4. The optical integrated device according to claim 1, wherein the optical waveguide is disposed on the substrate such that the output end surface is inclined relative to the dicing end surface.

5. The optical integrated device according to claim 1, wherein the dicing end surface that is diagonally inclined from a perpendicular direction that is orthogonal to the axial direction of the optical waveguide is formed on the substrate.

6. The optical integrated device according to claim 1, wherein the optical fiber is optically coupled to the output end surface of the second optical waveguide by filling an adhesive in a portion formed by the output end surface of the second optical waveguide and the dent portion.

7. An optical integrated circuit wafer comprising:
a substrate; and
a pair of optical integrated devices each of which is disposed on the substrate and includes an optical waveguide that has a hollow structure, wherein
each of the optical waveguides includes
a first optical waveguide, and
a second optical waveguide that is optically coupled to the first optical waveguide, and that has a relative refractive index difference that is smaller than a relative refractive index difference of the first optical waveguide, and
each of the optical waveguides converts a mode diameter to a mode diameter of an optical fiber in accordance with travelling of light from the first optical waveguide to the second optical waveguide, and
the optical integrated circuit wafer includes a pair of dent portions that are formed in a vicinity of a dicing line that connects a portion between one of the optical integrated devices and the other of the optical integrated devices out of the pair of optical integrated devices and that is located on the substrate such that a width of the dent portion including an output end surface of each of the second optical waveguides is smaller than a width of a glass block of the optical fiber that is optically coupled to the output end surface, the pair of dent portions being formed in a state in which the output end surface of the second optical waveguide included in the one optical integrated device out of the pair of optical integrated devices faces the output end surface of the second optical waveguide included in the other optical integrated device out of the pair of optical integrated devices in a separated manner, and the dent portion having a width calculated by Equation 1 below:

$$w \geq 2d*(\lambda/\pi D)$$

$\lambda$: a wavelength,
d: a depth of the dent portion,
w: a width of the dent portion
(w<a diameter of the leading end of the glass block of the fiber), and
D: a mode diameter.

8. The optical integrated circuit wafer according to claim 7, wherein
the substrate includes
a first substrate on which the one optical integrated device is disposed,
a second substrate on which the other optical integrated device is disposed, and
the dent portion that is disposed in the vicinity of the dicing line located between the first substrate and the second substrate, and
the optical integrated circuit wafer includes another optical waveguide that is disposed on the first substrate and the second substrate across the dicing line so as to be parallel to the optical waveguide included in the one optical integrated device and the optical waveguide included in the other optical integrated device.

9. The optical integrated circuit wafer according to claim 7, wherein
the substrate includes
a first substrate on which the one optical integrated device is disposed,
a second substrate on which the other optical integrated device is disposed, and
the dent portion that is disposed in the vicinity of the dicing line located between the first substrate and the second substrate, and
the optical integrated circuit wafer includes another optical waveguide that passes through from the one optical integrated device to the other optical integrated device by way of the dent portion across the dicing line.

10. A method of manufacturing an optical integrated device by cutting out the optical integrated device from an optical integrated circuit wafer that includes
a substrate, and
a pair of optical integrated devices each of which is disposed on the substrate and has an optical waveguide that has a hollow structure, and
each of the optical waveguides includes
a first optical waveguide, and
a second optical waveguide that is optically coupled to the first optical waveguide and that has a relative refractive index difference that is smaller than a relative refractive index difference of the first optical waveguide, and
the optical waveguide converts a mode diameter to a mode diameter of an optical fiber in accordance with travelling of light from the first optical waveguide to the second optical waveguide, the method of manufacturing the optical integrated device comprising:
forming a dent portion in a vicinity of a dicing line that connects a portion between one of the optical integrated devices and the other of the optical integrated devices and that is located on the substrate such that a width of the dent portion including an output end surface of each of the second optical waveguides is smaller than a width of a glass block of the optical fiber that is optically coupled to the output end surface of each of the second optical waveguides, the dent portion being formed in a state in which the output end surface of the second optical waveguide included in one of the optical integrated devices out of the pair of optical integrated devices faces the output end surface of the second optical waveguide included in the other of the optical integrated devices out of the pair of optical integrated devices in a separated manner; and
cutting out the one optical integrated device and the other optical integrated device from the optical integrated circuit wafer by dicing the dicing line included in the dent portion, and the dent portion having a width calculated by Equation 1 below:

$$w \geq 2d*(\lambda/\pi D)$$

$\lambda$: a wavelength,
d: a depth of the dent portion,
w: a width of the dent portion
(w<a diameter of the leading end of the glass block of the fiber), and
D: a mode diameter.

* * * * *